(12) United States Patent
Dorman

(10) Patent No.: US 12,433,690 B2
(45) Date of Patent: Oct. 7, 2025

(54) SYSTEM AND METHOD FOR LIDAR-BASED ANATOMICAL MAPPING

(71) Applicant: Circinus Medical Technology LLC, Concord, MA (US)

(72) Inventor: John Kyle Dorman, Midland, TX (US)

(73) Assignee: Circinus Medical Technology LLC, Concord, MA (US)

( * ) Notice: Subject to any disclaimer, the term of this patent is extended or adjusted under 35 U.S.C. 154(b) by 115 days.

(21) Appl. No.: 18/554,969

(22) PCT Filed: Apr. 13, 2022

(86) PCT No.: PCT/US2022/024683
§ 371 (c)(1),
(2) Date: Oct. 11, 2023

(87) PCT Pub. No.: WO2022/221449
PCT Pub. Date: Oct. 20, 2022

(65) Prior Publication Data
US 2024/0197411 A1 Jun. 20, 2024

Related U.S. Application Data

(60) Provisional application No. 63/174,928, filed on Apr. 14, 2021.

(51) Int. Cl.
*A61B 8/00* (2006.01)
*A61B 34/20* (2016.01)
(Continued)

(52) U.S. Cl.
CPC .............. *A61B 34/20* (2016.02); *A61B 90/37* (2016.02); *A61B 2034/105* (2016.02);
(Continued)

(58) Field of Classification Search
CPC .............. A61B 34/20; A61B 2034/105; A61B 2034/107; A61B 2034/2055
See application file for complete search history.

(56) References Cited

U.S. PATENT DOCUMENTS

| D323,504 S | 1/1992 | Langton |
|---|---|---|
| 5,143,076 A | 9/1992 | Hardy et al. |
| (Continued) | | |

FOREIGN PATENT DOCUMENTS

| CN | 101198958 A | 6/2008 |
|---|---|---|
| CN | 101528122 A | 9/2009 |
| (Continued) | | |

OTHER PUBLICATIONS

International Pat. Appl. No. PCT PCT/US2021/059965, International Search Report and Written Opinion dated Feb. 3, 2022, 7 pgs.
(Continued)

*Primary Examiner* — Joel F Brutus
(74) *Attorney, Agent, or Firm* — Foley & Lardner LLP

(57) ABSTRACT

System and method for lidar-based anatomical mapping is provided. In one implementation, a LIDAR imaging technology is utilized to create a surface-based anatomical map of an exposed anatomical surface of at least a portion of the spine, or other anatomical features, using anatomical and/or artificial landmarks are disclosed. The surface mapping can then be registered with previously acquired images of at least the portion of the spine, or other anatomical features. The surface mapping can then be used to identify important structures, including an entry point in tissue (including soft tissue and bone) for the placement of a medical instrument or implant, or for Information the orientation of a medical instrument or device. The information can be displayed in an augmented reality overlay on a device display (e.g., wear-
(Continued)

able eyeglasses). The LIDAR imaging technology may be incorporated into wearable eyeglasses.

24 Claims, 13 Drawing Sheets

(51) Int. Cl.
*A61B 90/00* (2016.01)
*A61B 34/10* (2016.01)

(52) U.S. Cl.
CPC . *A61B 2034/107* (2016.02); *A61B 2034/2055* (2016.02); *A61B 2090/365* (2016.02)

(56) References Cited

U.S. PATENT DOCUMENTS

| | | |
|---|---|---|
| 5,603,318 A | 2/1997 | Heilbrun et al. |
| 5,824,085 A | 10/1998 | Sahay et al. |
| 5,880,976 A | 3/1999 | Digioia III et al. |
| 6,129,670 A | 10/2000 | Burdette et al. |
| 6,139,544 A | 10/2000 | Mikus et al. |
| 6,246,474 B1 | 6/2001 | Cerni et al. |
| 6,511,236 B1 | 1/2003 | Webjorn et al. |
| 6,638,281 B2 | 10/2003 | Gorek |
| RE40,176 E | 3/2008 | Peshkin et al. |
| 7,611,522 B2 | 11/2009 | Gorek |
| 8,086,077 B2 | 12/2011 | Eichhorn |
| 8,442,621 B2 | 5/2013 | Gorek et al. |
| 9,038,971 B1 | 5/2015 | Guthrie |
| 9,119,572 B2 | 9/2015 | Gorek et al. |
| 9,216,048 B2 | 12/2015 | Markey et al. |
| D772,859 S | 11/2016 | Alesi et al. |
| 9,585,700 B2 | 3/2017 | Wehrle et al. |
| 9,687,306 B2 | 6/2017 | Markey et al. |
| 9,975,497 B2 | 5/2018 | Kim |
| 10,064,687 B2 | 9/2018 | Haimerl et al. |
| 10,123,840 B2 | 11/2018 | Dorman |
| 10,342,619 B2 | 7/2019 | Bracke et al. |
| 10,561,466 B2 | 2/2020 | Hedblom et al. |
| 10,602,114 B2 | 3/2020 | Casas |
| 10,603,116 B2 | 3/2020 | Markey et al. |
| 10,864,023 B2 | 12/2020 | Pak et al. |
| 10,908,771 B2 | 2/2021 | Berquam et al. |
| 11,000,335 B2 | 5/2021 | Dorman |
| 11,191,592 B2 | 12/2021 | Gorek et al. |
| 11,484,381 B2 | 11/2022 | Pak et al. |
| 11,826,111 B2 | 11/2023 | Mahfouz |
| 11,832,886 B2 | 12/2023 | Dorman |
| 12,096,993 B2 | 9/2024 | Toporek et al. |
| 2002/0035323 A1 | 3/2002 | Saha et al. |
| 2002/0077540 A1 | 6/2002 | Kienzle |
| 2002/0120252 A1 | 8/2002 | Brock et al. |
| 2002/0140694 A1 | 10/2002 | Sauer et al. |
| 2003/0181919 A1 | 9/2003 | Gorek |
| 2003/0199882 A1 | 10/2003 | Gorek |
| 2003/0236548 A1 | 12/2003 | Hovanes et al. |
| 2004/0068187 A1 | 4/2004 | Krause et al. |
| 2005/0113846 A1 | 5/2005 | Carson |
| 2005/0192575 A1 | 9/2005 | Pacheco |
| 2005/0236545 A1 | 10/2005 | Seil et al. |
| 2006/0004322 A1 | 1/2006 | Uesugi et al. |
| 2007/0262223 A1 | 11/2007 | Wang et al. |
| 2007/0276397 A1 | 11/2007 | Tacheco |
| 2008/0057889 A1 | 3/2008 | Jan |
| 2008/0086160 A1 | 4/2008 | Mastri et al. |
| 2008/0200927 A1 | 8/2008 | Hartmann et al. |
| 2009/0090757 A1 | 4/2009 | Kim et al. |
| 2009/0157083 A1 | 6/2009 | Park et al. |
| 2009/0163901 A1 | 6/2009 | Fisher et al. |
| 2009/0270868 A1 | 10/2009 | Park et al. |
| 2009/0292201 A1 | 11/2009 | Kruecker |
| 2009/0292279 A1 | 11/2009 | Bliweis et al. |
| 2009/0311655 A1 | 12/2009 | Karkanias et al. |
| 2010/0100081 A1 | 4/2010 | Tuma et al. |
| 2010/0153081 A1 | 6/2010 | Bellettre et al. |
| 2010/0198402 A1 | 8/2010 | Greer et al. |
| 2010/0210939 A1 | 8/2010 | Hartmann et al. |
| 2010/0274256 A1 | 10/2010 | Ritchey et al. |
| 2011/0098721 A1 | 4/2011 | Tran et al. |
| 2011/0214279 A1 | 9/2011 | Park et al. |
| 2011/0268248 A1 | 11/2011 | Simon et al. |
| 2012/0116203 A1 | 5/2012 | Vancraen et al. |
| 2012/0150243 A9 | 6/2012 | Crawford et al. |
| 2012/0232834 A1 | 9/2012 | Roche et al. |
| 2012/0319859 A1 | 12/2012 | Taub et al. |
| 2013/0060146 A1* | 3/2013 | Yang ............... A61B 34/20 600/476 |
| 2013/0085344 A1 | 4/2013 | Merkl et al. |
| 2013/0095855 A1 | 4/2013 | Bort |
| 2013/0114866 A1 | 5/2013 | Kasodekar et al. |
| 2013/0245461 A1 | 9/2013 | Maier-Hein et al. |
| 2013/0253599 A1 | 9/2013 | Gorek et al. |
| 2014/0148808 A1 | 5/2014 | Inkpen et al. |
| 2015/0010220 A1 | 1/2015 | Teichman et al. |
| 2016/0022374 A1 | 1/2016 | Haider et al. |
| 2016/0106202 A1 | 4/2016 | Ford |
| 2016/0235481 A1 | 8/2016 | Dorman |
| 2016/0250040 A1 | 9/2016 | Hermle et al. |
| 2016/0324580 A1 | 11/2016 | Esterberg |
| 2016/0373647 A1 | 12/2016 | Morate et al. |
| 2017/0007328 A1 | 1/2017 | Cattin et al. |
| 2017/0027651 A1 | 2/2017 | Esterberg |
| 2017/0035517 A1 | 2/2017 | Geri et al. |
| 2017/0071673 A1 | 3/2017 | Ferro et al. |
| 2017/0135706 A1 | 5/2017 | Frey et al. |
| 2017/0172696 A1 | 6/2017 | Saget et al. |
| 2017/0202633 A1 | 7/2017 | Liu |
| 2017/0221244 A1 | 8/2017 | Hiraga et al. |
| 2017/0245947 A1 | 8/2017 | Bozung et al. |
| 2017/0304011 A1 | 10/2017 | Markey et al. |
| 2017/0333134 A1 | 11/2017 | Wollowick et al. |
| 2017/0367771 A1* | 12/2017 | Tako ............... G06T 19/003 |
| 2018/0000380 A1 | 1/2018 | Stein et al. |
| 2018/0008358 A1 | 1/2018 | Kostrzewski et al. |
| 2018/0092699 A1 | 4/2018 | Finley et al. |
| 2018/0140362 A1 | 5/2018 | Cal et al. |
| 2018/0303559 A1 | 10/2018 | Shepherd et al. |
| 2018/0310956 A1 | 11/2018 | Polster |
| 2018/0325618 A1 | 11/2018 | Justin et al. |
| 2019/0029757 A1 | 1/2019 | Roh et al. |
| 2019/0046278 A1 | 2/2019 | Steinle et al. |
| 2019/0060000 A1 | 2/2019 | Dorman |
| 2019/0090959 A1 | 3/2019 | Haider et al. |
| 2019/0223962 A1 | 7/2019 | Roldan et al. |
| 2019/0254754 A1* | 8/2019 | Johnson ............... G06T 19/006 |
| 2019/0336179 A1 | 11/2019 | Pak et al. |
| 2019/0357809 A1 | 11/2019 | Borja |
| 2019/0388173 A1 | 12/2019 | Pak et al. |
| 2020/0051274 A1 | 2/2020 | Siemionow et al. |
| 2020/0111213 A1 | 4/2020 | Chacon et al. |
| 2020/0197191 A1 | 6/2020 | Akhlaghpour et al. |
| 2020/0229869 A1 | 7/2020 | Dorman |
| 2020/0305985 A1 | 10/2020 | Tolkowsky |
| 2021/0038340 A1 | 2/2021 | Itkowitz et al. |
| 2021/0100536 A1 | 4/2021 | Spindle |
| 2021/0186617 A1 | 6/2021 | Gorek et al. |
| 2021/0228279 A1 | 7/2021 | Dorman |
| 2022/0192756 A1 | 6/2022 | Dorman |
| 2022/0201199 A1 | 6/2022 | Dorman |
| 2022/0237817 A1 | 7/2022 | Dorman |
| 2022/0241018 A1 | 8/2022 | Dorman |
| 2022/0351410 A1 | 11/2022 | Siemionow et al. |
| 2023/0036038 A1 | 2/2023 | Finley et al. |
| 2023/0054394 A1 | 2/2023 | Luo et al. |
| 2023/0131831 A1 | 4/2023 | Dorman |
| 2023/0172631 A1 | 6/2023 | Richter et al. |
| 2023/0346481 A1 | 11/2023 | Dorman |

FOREIGN PATENT DOCUMENTS

| | | |
|---|---|---|
| CN | 101721231 A | 6/2010 |
| CN | 101984931 A | 3/2011 |
| CN | 103519895 A | 1/2014 |

(56) References Cited

FOREIGN PATENT DOCUMENTS

| | | |
|---|---|---|
| EP | 2 901 957 A1 | 8/2015 |
| KR | 101478522 B1 | 1/2015 |
| KR | 101901521 B1 | 9/2018 |
| WO | WO-2013/020026 A1 | 2/2013 |
| WO | WO-2014/025305 A1 | 2/2014 |
| WO | WO-2014/063181 A1 | 5/2014 |
| WO | WO-2015/168781 A1 | 11/2015 |
| WO | WO-2016/007936 A2 | 1/2016 |
| WO | WO-2016/131016 A2 | 8/2016 |
| WO | WO-2017/167799 A1 | 10/2017 |
| WO | WO-2018/200767 A1 | 11/2018 |
| WO | WO-2019/036524 A1 | 2/2019 |
| WO | WO-2020/105049 A1 | 5/2020 |
| WO | WO-2020/214645 A1 | 10/2020 |
| WO | WO-2020/214744 A1 | 10/2020 |
| WO | WO-2020/216934 A1 | 10/2020 |
| WO | WO-2022/109185 A1 | 5/2022 |

OTHER PUBLICATIONS

International Pat. Appl. No. PCT/US2020/028220, International Search Report and Written Opinion, dated Aug. 14, 2020, 22 pgs.
International Pat. Appl. No. PCT/US2020/028375, International Search Report and Written Opinion dated Jul. 21, 2020, 10 pgs.
International Patent Appl. No. PCT/US2022/022204, International Search Report and Written Opinion dated Jun. 10, 2022, 18 pgs.
International Search Report and Written Opinion for International Patent Application PCT/US2022/024683 dated Jun. 21, 2022.
International Search Report and Written Opinion in corresponding international application No. PCT/US2016/017897, mailed Aug. 24, 2016, 13 pages.
International Search Report and Written Opinion in PCT/US18/46786, dated Dec. 13, 2018, 10 pgs.
International Search Report and Written Opinion issued in PCT/US2022/014988 Dtd Apr. 6, 2022, 17 pages.
International Search Report and Written Opinion on PCT/US2022/047306 Dated Mar. 28, 2023.
Julian Horsey, "Ozaki iCoat Finger Case Makes Draw Something Even More Fun", Apr. 20, 2012, pp. 1-11, XP093028330, Retrieved from the Internet: URL:https://www.geeky-gadgets.com/ozaki-icoat-finger-case-makes-draw-someting-even-more-fun-20-04-2012/ [retrieved on Mar. 2, 2023].
Merloz et al., "Pedicle Screw Placement Using Image Guided Techniques." Clinical Orthopaedics and Related Research, No. 354, pp. 39-48, 1998, entire document [online] URL=<https://journals.lww.com/clinorthop/Fulltext/1998/09000/Pedicle_Screw_Placement_Using_Image_Guided.6.aspx>.
U.S. Appl. No. 16/639,107, filed Feb. 13, 2020, System and Method Using Augmented Reality With Shape Alignment for Medical Device Placement.
U.S. Appl. No. 17/604,359, filed Oct. 15, 2021, Attachjvient Apparatus to Secure a Medical Alignment Device to Align a Tool.
U.S. Appl. No. 17/604,362, filed Oct. 15, 2021, Orientation Calibration System for Image Capture.
U.S. Appl. No. 17/530,311, filed Nov. 18, 2021, Systems and Methods for Artificial Intelligence Based Image Analysis for Placement of Surgical Appliance.
U.S. Appl. No. 17/591,478, filed Feb. 2, 2022, Systems and Methods for Simulating Three-Dimensional Orientations of Surgical Hardware Devices About an Insertion Point of an Anatomy.
U.S. Appl. No. 18/553,025, filed Sep. 28, 2023, System and Method for Simulating an Orientation of a Medical Device at an Insertion Point.
U.S. Appl. No. 17/970,378, filed Oct. 20, 2022, Attachment Apparatus to Secure a Medical Alignment Device to Align a Tool.
U.S. Appl. No. 18/350,672, filed Jul. 11, 2023, System and Method for Medical Device Placement.
A. Elmi-Terander et al., "Surgical Navigation Technology Based on Augmented Reality and Integrated 3D Intraoperative Imaging: A Spine Cadaveric Feasibility and Accuracy Study", Spine 41.21 (2016): E1303-E1311.
M. Herold, "Using Deep Convolutional Networks to Regress a C-arm's Position from a single X-ray Image", Diss. 2020.
G. Wells et al., "Vision-based robot positioning using neural networks", Image and Vision Computing, 14 (1996) 715-732.
Extended European Search Report on EP 22788881.5 Dtd Jan. 21, 2025 (12 pgs.).
Harrison, Peter, Simpler Line Follower Sensors, Micromouse Online, Apr. 15, 2011, https://web.archive.org/web/20120422001123 /https://micromouseonline.com/2011/04/15/simpler-line-follower-sensors/. (Year: 2011), 3 pgs.
NumPy—Data Types, tutorialspoint, https://web.archive.org/web/20181126133733/https://www.tutorialspoint.com/numpy/numpy_data_type.htm. 2018 (Year: 2018), 8 pgs.
U.S. Appl. No. 18/513,155, filed Nov. 17, 2023, Circinus Medical Technology LLC.
U.S. Appl. No. 18/553,025, filed Sep. 28, 2023, Circinus Medical Technology LLC.
International Search Report and Written Opinion in PCT/US2024/041823 dated Jan. 13, 2025.
Crescendo CR-30 phone holder. Amazon datasheet [online]. Crescendo, first available on Nov. 18, 2017. [Retrieved on Jun. 13, 2024]; Retrieved from the Internet. <URL: https://a.co/d/fyEOcbM>.

* cited by examiner

SYSTEM AND METHOD FOR LIDAR-BASED ANATOMICAL MAPPING

CROSS-REFERENCE TO RELATED PATENT APPLICATIONS

This application is a U.S. national phase application under 35 U.S.C. § 371 of International Application No. PCT/US2022/024683, filed Apr. 13, 2022, which claims priority to U.S. Provisional Application No. 63/174,928, filed Apr. 14, 2021, both of which are incorporated herein by reference in their entirety for any and all purposes. This application is related to PCT Application No. PCT/US2022/022204, entitled "System and Method for Simulating an Orientation of a Medical Device at an Insertion Point," filed on Mar. 28, 2022, which is incorporated herein by reference in its entirety and for all purposes.

BACKGROUND

In the practice of image-guided surgery, a surgeon utilizes graphical information conveyed to them on a display screen. The display screen is typically on an external display located away from the surgical field, thereby requiring the surgeon to look away from the field and towards the external display. In other systems, the display screen is incorporated into a device which is in the surgical field, such as a smartphone, iPod Touch®, or other similar device. The smaller image guidance systems do not have a means of locating the entry point for surgical instruments, devices, or implants. Instead, the surgeon must locate the entry point based on their prior existing knowledge of the anatomy and then use the smaller display systems to provide the trajectory.

SUMMARY

This summary is provided to introduce a selection of elements and aspects that are further described below in the detailed description. This summary is not intended to identify key or essential features of the claimed subject matter, nor is it intended to be used as an aid in limiting the scope of the claimed subject matter.

In one general aspect, an apparatus for determining a desired orientation of an instrument for positioning a medical device in a body is provided. The apparatus includes an electronic device configured to display an image of at least a portion of the body adjacent to where the medical device will be positioned. The electronic device includes an orientation sensor and a processor. The process simulates a positioning of the medical device relative to the image to determine a desired insertion angle of the medical device relative to a plane of the body, determines an orientation of the electronic device using the orientation sensor, and outputs a notification when the orientation of the electronic device is such that the electronic device is positioned at or about the desired insertion angle of the medical device relative to the plane of the body.

In another general aspect, an apparatus for determining orientation of an instrument for positioning a medical device in a body is provided. The apparatus includes an electronic device and a display device. The electronic device and the display device may utilize one or more processors. The one or more processors are configured to receive a first input from a user specifying a first positioning angle of the medical device in a first view of at least a portion of the body, receive a second input from the user specifying a second positioning angle of the medical device in a second view of the at least a portion of the body, the second view orthogonal (or at some known angle relative to the first view) to the first view and determine, based on the first input, the second input, and an insertion point, a three-dimensional orientation of the electronic device for positioning the medical device in the body determined from the first positioning angle and the second positioning angle. The one or more processors are configured to display visual indicia at the display device that includes the three-dimensional orientation of the medical device.

In yet another general aspect, a method for determining orientation of an instrument for positioning a medical device in a body is provided. The method includes simulating an orientation of a simulated medical device on a diagnostic representation of at least a portion of the desired location in the body, and aligning the instrument for positioning the medical device at the desired location in the body, according to the simulation of the simulated medical device, through an insertion point of the body by indicating when an orientation is within a threshold of the simulated orientation.

BRIEF DESCRIPTION OF THE DRAWINGS

For a more complete understanding of various embodiments of the present invention and the advantages thereof, reference is now made to the following brief description, taken in connection with the accompanying drawings, appendices, and detailed description, wherein like reference numerals represent like parts, and in which.

DETAILED DESCRIPTION

Figure 1:
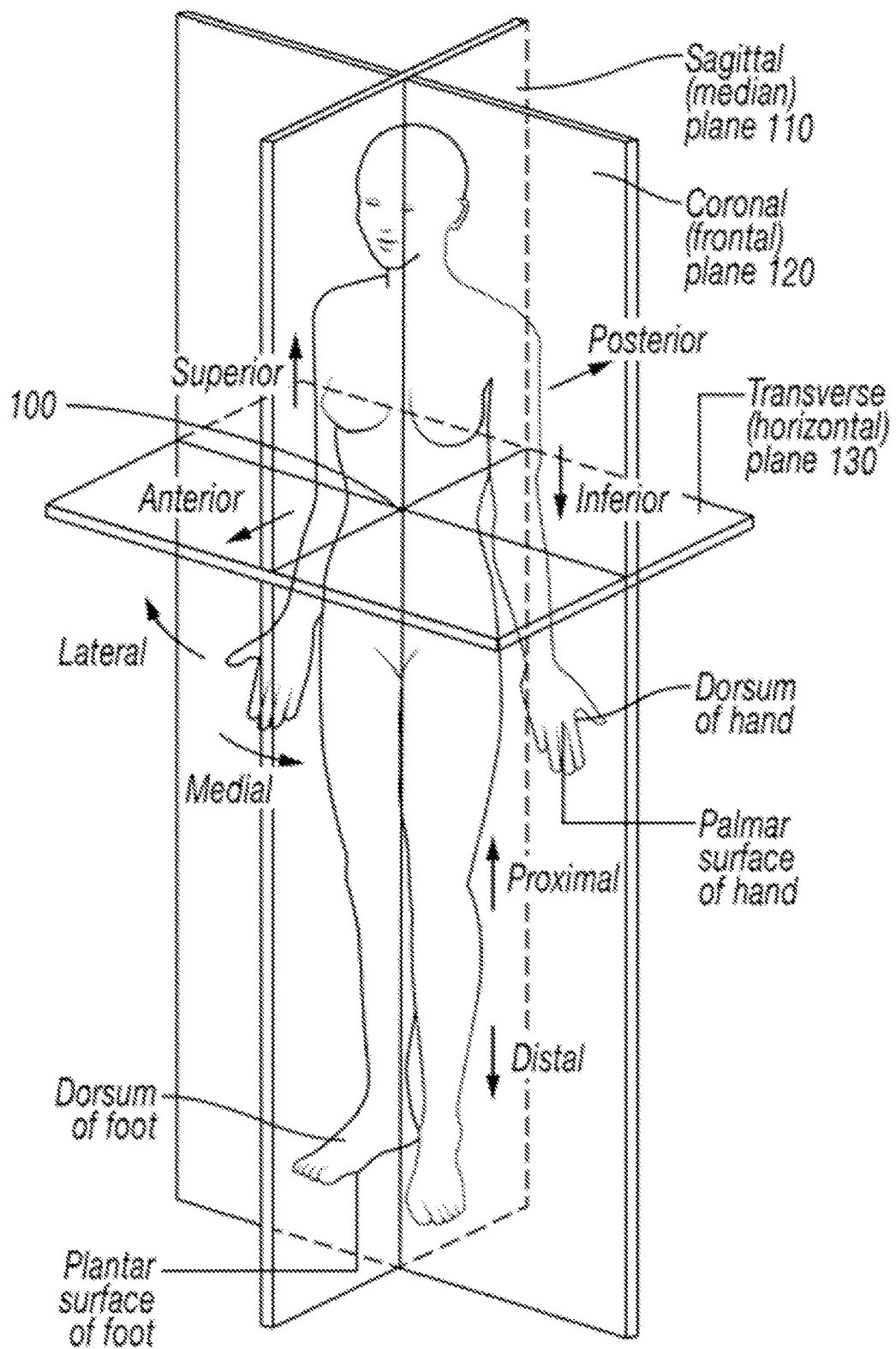
FIG. 1 illustrates definitions of a sagittal plane, a frontal plane, and a transverse plane relative to a patient's body.

In accordance with several embodiments, devices and methods to facilitate surface-based image-guided surgery or insertion of surgical tools and/or medical devices (e.g., diagnostic devices, permanent implants, pedicle screws, intervertebral body fusion devices, temporary probes) are described herein. Smaller image guidance systems (e.g., portable or mobile computing and/or imaging devices) may be used which can localize and display an entry point for a surgeon or clinician in real time based on preoperative and/or intraoperative acquisition of images (and optionally intraoperative mapping) of a particular portion of an anatomy.

For example, a mobile computing device including surface-based sensing or imaging technology (e.g., Light Detection and Ranging ("LIDAR") technology, optical topographical imaging) may be used to obtain data that can be used to create a 2D or 3D image map of an anatomical surface or profile. The anatomical surface or profile may be a portion of a subject's anatomy that is surgically exposed in preparation for an invasive procedure or intraoperatively during a surgical procedure. For example, the anatomical surface or profile may be an exposed portion of a subject's spine anatomy (e.g., portion of a vertebral column comprising multiple vertebrae). The anatomical surface or profile map may then be registered or correlated, utilizing the digital imaging and communication in medicine (DICOM) standard, to previously-acquired diagnostic medical images (e.g., computed tomography ("CT") images, magnetic resonance imaging ("MRI") images, millimeter wave ("MM") images, X-ray images, fluoroscopy images) of the anatomy. The correlation or registration of the surface-based (e.g., LIDAR, optical topographical) mapping with the previously-acquired diagnostic images can facilitate identification (e.g., automated determination, calculation) of an ideal entry point for a surgical tool and/or medical device based, at least in part, on the correlated or co-registered imaging without requiring advance anatomical knowledge of the particular anatomy by the surgeon or other clinician.

The ideal, or desired, entry point can be displayed (e.g., overlaid, superimposed) on the surface-based map or on an optical image of the patient anatomy. The display may be located on the mobile computing device or on a separate display device (e.g., a wearable headset or goggles or glasses). In some implementations, augmented reality technology may be utilized to display the ideal entry point to a surgeon. For example, the mobile computing device or wearable eyewear (e.g., goggles or glasses) may include an optical camera to capture live ("real-time") video footage or feed of the patient anatomy and a virtual graphical icon (e.g., 2D or 3D image) may be overlaid or superimposed on the live video footage to indicate the ideal entry insertion point (and optionally trajectory (and/or ideal entry angle) for 3D images). Alphanumeric information (e.g., labels indicating certain anatomical features) may also be overlaid or superimposed on the live video footage. The surgeon can insert a surgical tool or medical device into the ideal entry insertion point in real time with increased confidence in the accuracy of the entry insertion point (and optionally, trajectory).

The entry insertion point identification techniques may also be combined with orientation/trajectory determination techniques that may also be carried out using the mobile computing device. The mobile computing device may include a downloadable software application that is configured to perform both entry insertion point identification based on surface-based sensing or imaging technology and orientation/trajectory determination.

As one example implementation, the mobile computing device can be used to identify an entry insertion point for insertion of one or more pedicle screws into one or more vertebrae and/or one or more intervertebral fusion devices between vertebrae in conjunction with a surgical fusion, or arthrodesis, procedure. Pilot holes may be formed by a drill or needle prior to insertion of the one or more pedicle screws. The mobile computing device may be used to capture LIDAR data of an anatomical surface or profile of at least a portion of the spine (e.g., lumbosacral region, lumbar region, sacral region, thoracic region, and/or cervical region of the vertebral column). For example, spinous processes and other anatomical landmarks may be identified based on the LIDAR data. The LIDAR data may be used to create a surface map of at least a portion of the spine. The LIDAR mapping may be correlated or registered to one or more previously-acquired diagnostic images (sometime referred to herein as "DICOM data") of at least the portion of the spine utilizing the DICOM standard. The mobile computing device can then execute stored algorithms to identify an ideal entry, or insertion, point through which the pilot hole formation tool or the pedicle screw can be inserted.

In accordance with several embodiments, a method of facilitating insertion of a surgical tool or medical device into a subject includes receiving scanning data obtained by scanning a surgically-exposed anatomical surface of a subject with surface-based imaging technology (e.g., LIDAR imaging technology). The method further includes generating an anatomical surface map of the anatomical surface of the subject using anatomical landmarks identified based on the received scanning data. The method also includes correlating the anatomical surface map of the anatomical surface of the subject with one or more pre-operative diagnostic images of the subject corresponding to the anatomical surface. The method further includes automatically identifying an external anatomical entry point for insertion of the surgical tool or medical device based on said correlating. The method may also include generating an output indicative of the identified anatomical external entry point.

In some implementations, generating the output comprises generating a 2D or 3D virtual digital icon or image that is superimposed on an augmented reality display of a mobile computing device and/or a wearable augmented reality device (e.g., wearable eyewear such as glasses or goggles). The virtual digital icon may include a cross-hair digital icon, an "X", a dot, or other indicator. The virtual digital icon may be a 3D shape (e.g., cylinder) or 3D representation of a medical instrument or guide that may also be indicative of a desired trajectory for insertion of a medical instrument. The digital icon or image may be colored to facilitate identification. The one or more diagnostic images may be stored in memory of the mobile computing device.

The method may also include determining a desired orientation and trajectory for the surgical tool or medical device to follow at the external anatomical entry point. The method may further include generating an output of the desired orientation and trajectory on the augmented reality display.

In accordance with several embodiments, a method of facilitating insertion of a surgical tool or medical device into a subject includes receiving scanning data obtained by scanning a surgically-exposed anatomical surface of a portion of a spine of a subject with LIDAR imaging technology. The method further includes generating an anatomical surface map of the anatomical surface of the portion of the spine of the subject using anatomical landmarks (e.g., spinous processes of vertebrae) identified based on the received scanning data, correlating the anatomical surface map of the anatomical surface of the portion of the spine of the subject with one or more pre-operative diagnostic images of at least the portion of the spine of the subject, and automatically identifying an anatomical entry point for insertion of the surgical tool or medical device based on the correlating. The method may also include generating an output indicative of the identified anatomical entry point and/or trajectory for insertion of the surgical tool or medical device.

The one or more diagnostic images may comprise computed tomography images, magnetic resonance images, or other diagnostic images. The LIDAR imaging technology may include a built-in LIDAR sensor of a mobile computing device. The one or more diagnostic images may be stored in memory of the mobile computing device. The mobile computing device may further include a display and an optical camera. The display of the mobile computing device may include an augmented reality display configured to display virtual digital images superimposed on live video footage of the optical camera. Generating the output may include generating a 2D or 3D virtual digital icon or image that is superimposed on the live video footage on the display of the mobile computing device. The virtual digital icon may include a cross-hair digital icon, an "X", a dot, or other indicator. The virtual digital icon may be a 3D shape (e.g., cylinder) or 3D representation of a medical instrument or guide that may also be indicative of a desired trajectory for insertion of a medical instrument. The virtual digital icon or image may be colored to facilitate ease of identification.

In some implementations, the LIDAR imaging technology comprises a standalone LIDAR scanning device. In some implementations, the LIDAR imaging technology comprises a built-in LIDAR sensor of a wearable augmented reality device. The wearable augmented reality device may comprise wearable glasses or goggles. The wearable augmented reality device (e.g., wearable glasses or goggles) may include an optical camera in addition to the built-in LIDAR sensor. The wearable augmented reality device may also include a display (e.g., heads-up display). The display of the wearable augmented reality device may include an augmented reality display configured to display virtual digital images superimposed on live video footage of the optical camera. Generating the output may include generating a 2D or 3D virtual digital icon or image that is superimposed on the live video footage on the display of the augmented reality device (e.g., wearable glasses or goggles). The virtual digital icon may include a cross-hair digital icon, an "X", a dot, or other indicator. The virtual digital icon may be a 3D shape (e.g., cylinder) or 3D representation of a medical instrument or guide that may also be indicative of a desired trajectory for insertion of a medical instrument. The digital icon or image may be colored to facilitate identification. The virtual digital icon may be colored to facilitate ease of identification. The virtual digital icon may indicate the anatomical entry point.

The landmarks used may additionally or alternatively include artificial landmarks. The method may further include determining a desired orientation and trajectory for the surgical tool or medical device to follow at the anatomical entry point using an orientation sensor of the mobile computing device or wearable augmented reality device. The method may also include generating an output of the desired orientation and trajectory on a display of the mobile computing device. The display may comprise an augmented reality display and the output may comprise a virtual graphical icon.

Any or all of the steps of the method are performed by one or more processors of a single mobile computing device or certain steps of the method may be performed by different mobile computing devices. One of the mobile computing devices may be a component of an augmented reality pair of eyeglasses.

In accordance with several embodiments, a system for facilitating insertion of a surgical tool or medical device into a subject includes a mobile computing device including a LIDAR scanner, an optical camera, a display screen, and a processor. The processor is configured to execute program instructions stored on a non-transitory computer-readable storage medium. The processor is configured to, upon execution of stored program instructions, receive scanning data corresponding to a surgically-exposed anatomical surface of at least a portion of a spine of a subject obtained by the LIDAR scanner. The processor is further configured to generate an anatomical surface map of the anatomical surface of the portion of the spine of the subject using anatomical landmarks identified based on the received scanning data and to correlate the anatomical surface map with one or more pre-operative diagnostic images of at least the portion of the spine of the subject. The processor is also configured to automatically determine an anatomical entry point for insertion of the surgical tool or medical device based on the correlation. The processor may be configured to generate an output indicative of the determined anatomical entry point for display and/or trajectory of insertion of the surgical tool or medical device.

In some implementations, the optical camera is configured to obtain still images or live video footage.

In some implementations, the mobile computing device further comprises an orientation sensor. The one or more diagnostic images may include CT or MRI images. The display screen of the mobile computing device is configured to provide an augmented reality display that displays virtual digital images superimposed on a live video footage of the optical camera. The output may include a 2D or 3D virtual digital icon that is superimposed on the live video footage on the display screen of the mobile computing device. The virtual digital icon may include a cross-hair digital icon, an "X", a dot, or other indicator. The virtual digital icon may be a 3D shape (e.g., cylinder) or 3D representation of a medical instrument or guide that may also be indicative of a desired trajectory for insertion of a medical instrument. The digital icon or image may be colored to facilitate ease of identification. The virtual digital icon may indicate the anatomical entry point and/or trajectory of insertion of the medical instrument.

In accordance with several embodiments, a system for facilitating insertion of a surgical tool or medical device into a subject includes a LIDAR scanner, an optical camera configured to obtain still images or live video footage, a display screen, and a processor. The processor is configured to execute program instructions stored on a non-transitory computer-readable storage medium. The processor is configured to, upon execution of stored program instructions, receive scanning data corresponding to an exposed anatomical surface of a portion of a spine of a subject obtained by the LIDAR scanner, generate an anatomical surface map of at least the exposed anatomical surface of the portion of the spine of the subject using anatomical landmarks identified based on the received scanning data, correlate the anatomical surface map of at least the exposed anatomical surface of the portion of the spine of the subject with one or more pre-operative diagnostic images of at least the portion of the spine of the subject, and automatically determine an anatomical entry point for insertion of the surgical tool or medical device based on the correlating. The processor may also be configured to generate an output indicative of the determined anatomical entry point and/or trajectory for display.

In some implementations, the display screen is configured to provide an augmented reality display that displays virtual digital images superimposed on a live video footage of the optical camera.

In some implementations, the LIDAR scanner, the optical camera, and the processor are housed within a mobile computing device and the display screen is housed within a wearable augmented reality device communicatively coupled to the mobile computing device.

In some implementations, the LIDAR scanner, the optical camera, the processor, and the display screen reside on or in a standalone wearable augmented reality device.

The one or more diagnostic images may include CT or MRI images. The output may include a 2D or 3D virtual digital icon that is superimposed on the live video footage on the display screen.

In accordance with several embodiments, a system for facilitating insertion of a surgical tool or medical device into a subject includes a LIDAR scanner, an optical camera configured to obtain still images or live video footage, a display screen, and a processor. The processor is configured to receive scanning data corresponding to an exposed anatomical surface of a portion of a spine of a subject obtained by the LIDAR scanner, generate an anatomical surface map of the exposed anatomical surface of the portion of the spine of the subject using anatomical landmarks identified based on the received scanning data, correlate the anatomical surface map with one or more diagnostic images of at least the portion of the spine of the subject, and automatically determine an anatomical entry point for insertion of the surgical tool or medical device based on the correlating. The processor may also be configured to generate an output indicative of the determined anatomical entry point for display. In some implementations, robotic guidance or surgical systems may be used to facilitate insertion at the determined anatomical entry point and along a determined trajectory. In other implementations, insertion may be performed manually by a surgeon.

Several embodiments of the invention have one or more of the following advantages: (i) increased treatment accuracy; (ii) increased efficacy and enhanced safety; (iii) increased efficiency as a result of fewer attempts to access a target treatment or diagnostic location; (iv) increased precision; (v) maintained focus on surgical field of view; (vi) ease of use; (vii) faster registration.

For purposes of summarizing the disclosure, certain aspects, advantages, and novel features of embodiments of the disclosure have been described herein. It is to be understood that not necessarily all such advantages may be achieved in accordance with any particular embodiment of the disclosure provided herein. Thus, the embodiments disclosed herein may be embodied or carried out in a manner that achieves or optimizes one advantage or group of advantages as taught or suggested herein without necessarily achieving other advantages as may be taught or suggested herein.

The methods summarized above and set forth in further detail below describe certain actions taken by a practitioner; however, it should be understood that they can also include the instruction of those actions by another party. For example, actions such as "capturing one or more images" include "instructing the capturing of one or more images." Further aspects of embodiments of the disclosure will be discussed in the following portions of the specification. With respect to the drawings, elements from one figure may be combined with elements from the other figures.

Several implementations described herein are directed to systems and methods for facilitating access to target treatment locations within bone (e.g., one or more vertebral bodies of a spine) with increased confidence in safety and accuracy and increased efficiency. In addition, several implementations do not require any particular advance prior anatomical knowledge by the surgeon. In some implementations, one or more bones (e.g., vertebral bodies) of the spine access is facilitated for medical devices (e.g., surgical tools, diagnostic tools, permanent implants) intended to diagnose and/or treat back pain or other ailments or conditions associated with the spine (e.g., vertebral fractures, scoliosis, spondylosis). As one example, the systems and methods may facilitate insertion of surgical tools and/or implants for vertebral fusion, or arthrodesis, such as pedicle screws or interbody devices (e.g., cages with bone graft material or substances).

However, the systems and methods may be used to facilitate improved access for tools used in other spinal procedures or non-spinal procedures (e.g., fusion of other bones such as in the ankle or foot, bone replacement surgery, insertion of bone screws to provide fixation and stabilization of bone fractures). In accordance with several embodiments, the systems and methods described herein advantageously reduce the need for, or extent of use, of fluoroscopy during the procedure, which can further improve patient and clinician safety and speed up the intraoperative registration process, which can reduce the duration of the surgery.

FIG. 1 illustrates a sagittal or median plane 110, a frontal or coronal plane 120, and a horizontal or transverse plane 130 relative to a patient's body part 100 located at the intersection of the sagittal plane 110, the coronal plane 120, and the transverse plane 130. Each plane is orthogonal to each other such that if the position or orientation of an object, device, or medical hardware, such as a pedicle screw, is known in two of the orthogonal planes, the three-dimensional orientation angle of such item may be calculated or known. When discussing a vertebra (or other body parts) in the following disclosure, reference is made to the sagittal plane, coronal plane, and transverse plane. It should be understood that, when these planes are mentioned, they are not intended as a reference only to the specific sagittal, coronal, and transverse planes illustrated in FIG. 1, but rather, are intended as a reference to illustrate an orientation or location relative to the specific vertebra or body part being discussed.

Figure 2A:
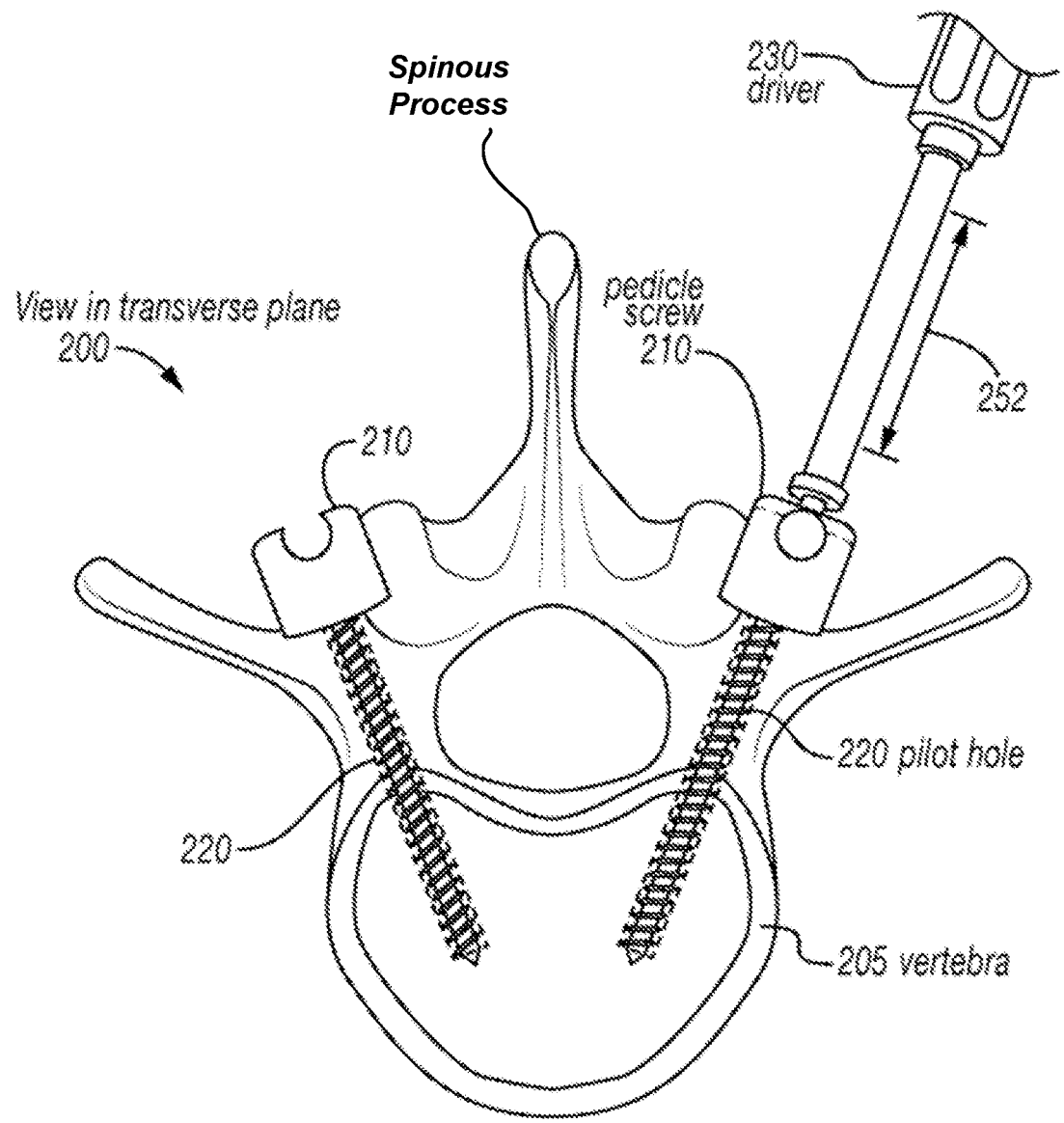
FIG. 2A illustrates a cross-sectional view of a vertebra having pedicle screws installed in respective pilot holes.
Figure 2B:
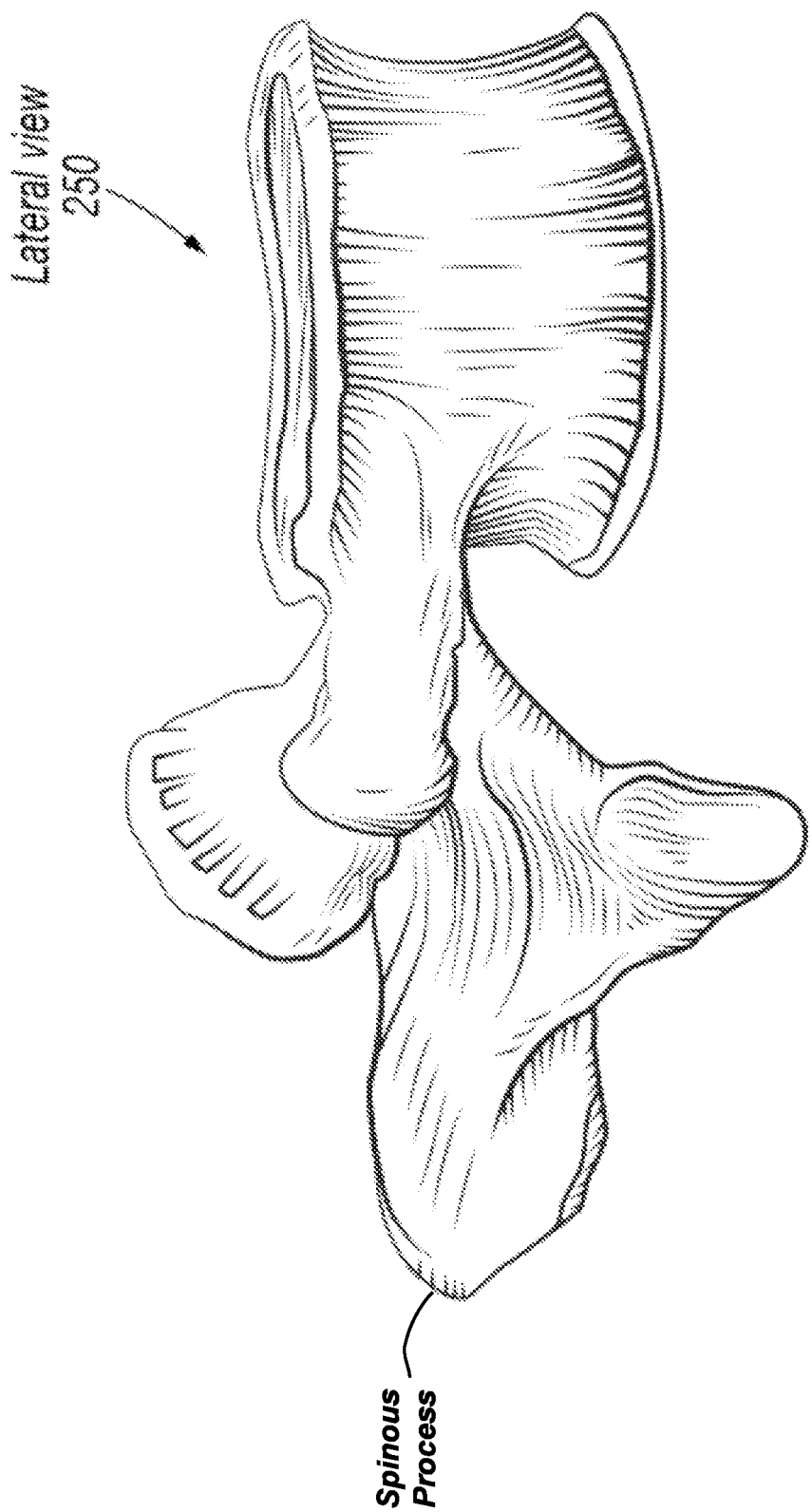
FIG. 2B illustrates an example lateral view of a vertebra for installing pedicle screws.
Figure 2C:
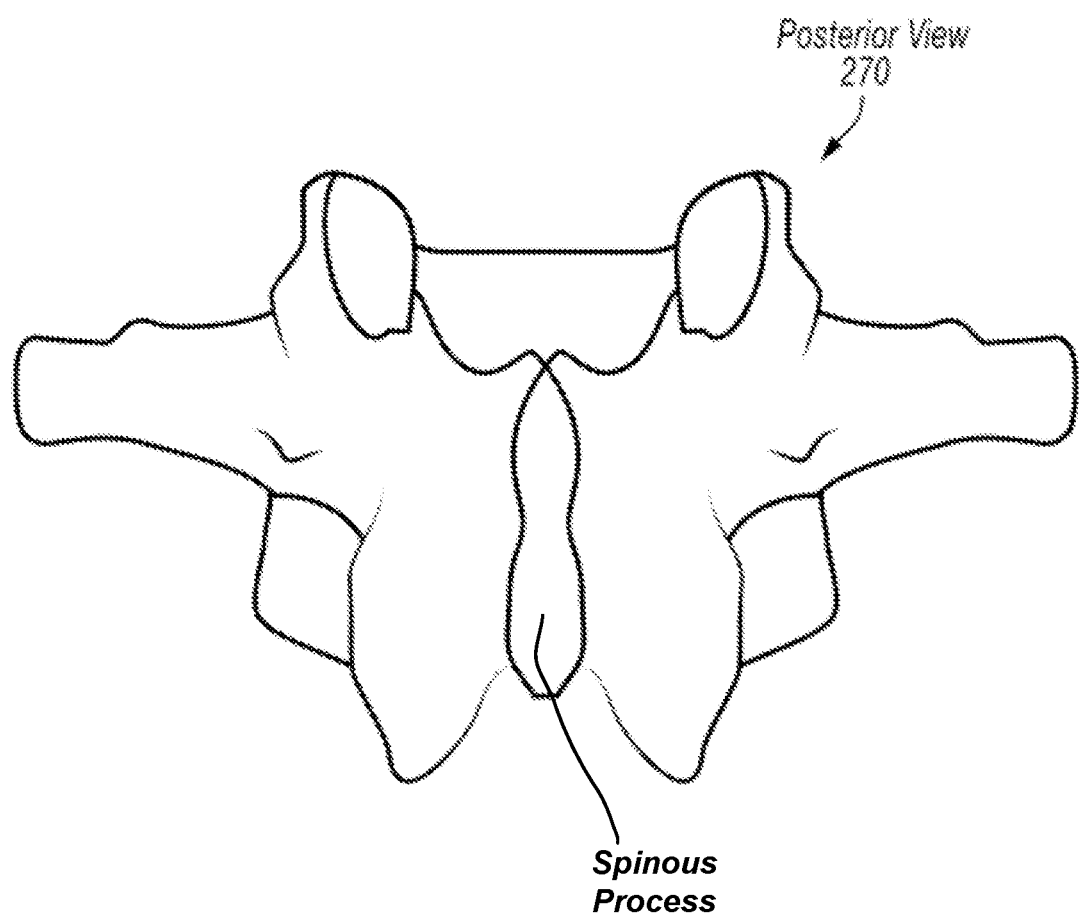
FIG. 2C illustrates an example posterior view of a vertebra for installing pedicle screws.

As previously mentioned, the systems and methods described herein may facilitate insertion of surgical tools and/or implants for vertebral fusion, or arthrodesis. FIG. 2A illustrates a cross sectional, axial view (may be referred to as a superior view) 200 of a vertebra 205 having pedicle screws 210 installed in respective pilot holes 220. A driver 230 may be used to screw the pedicle screws 210 positioned in the pilot holes 220 fully within a pedicle of the vertebra 205. Various shapes and types of pedicle screws 210 and driver 230 may be used. The pedicle screws 210 and driver 230 shown in FIG. 2A are for illustrative purposes only. A mating portion 252 of the driver 230, which may be referred to as a tool or a medical tool, may be provided to allow a medical alignment device in an attachment apparatus to "mate" or position adjacent such mating portion 252 to ensure that the driver 230 is installing the pedicle screw at a desired alignment angle (also referred to as "entry angle"), such as a three-dimensional alignment angle. FIG. 2B illustrates a lateral view (i.e., side view) 250 of a vertebra, which could be an orthogonal view of the vertebra 205 of FIG. 2A. FIG. 2C illustrates a posterior view 270 of the vertebra 205. It can be particularly important to ensure that pedicle screws are inserted at a proper entry point and along a proper trajectory so as to facilitate correct insertion, to reduce trauma to bone, to avoid injury to neighboring structures, and/or to improve retention of the pedicle screw within the bone. Pilot entry holes can be created at a proper entry point and along a proper trajectory to facilitate correct insertion based on guidance according to the disclosure herein.

Figure 3A:
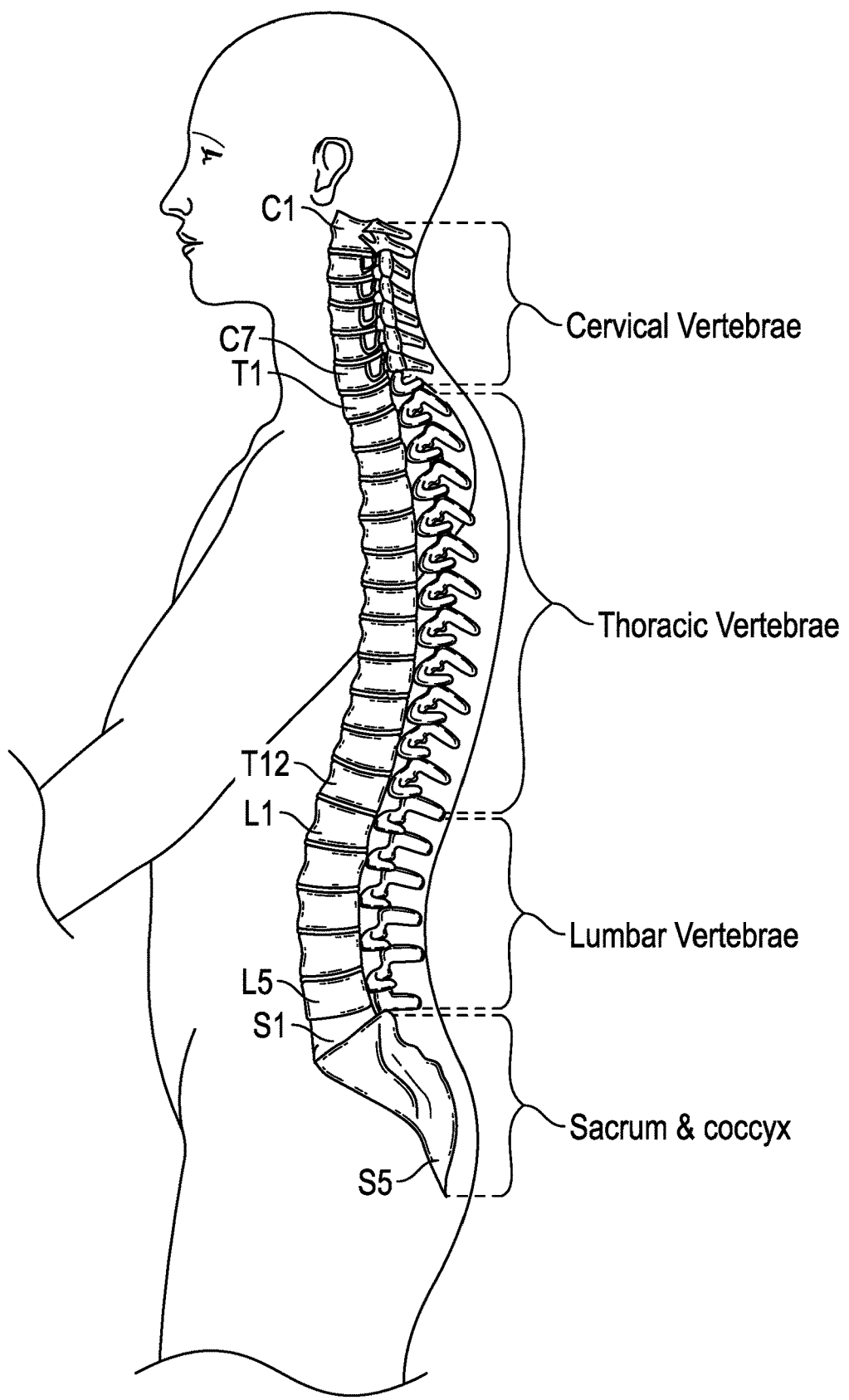
FIG. 3A illustrates a side view of a human subject illustrating a spine positioned beneath a skin surface.

FIG. 3A is a side view of a human subject and illustrates the various vertebral levels of the spine. As shown, the human spine typically includes 29 vertebrae arranged in four vertebral levels: cervical vertebrae (C1-C7), thoracic vertebrae (T1-T7), lumbar vertebrae (L1-L5), and sacral vertebrae (S1-S5). As shown, a posterior-most portion of each vertebrae (e.g., spinous process) is positioned just below a skin surface. Different vertebrae may be spaced more or less from the skin surface than other vertebrae.

Figure 3B:
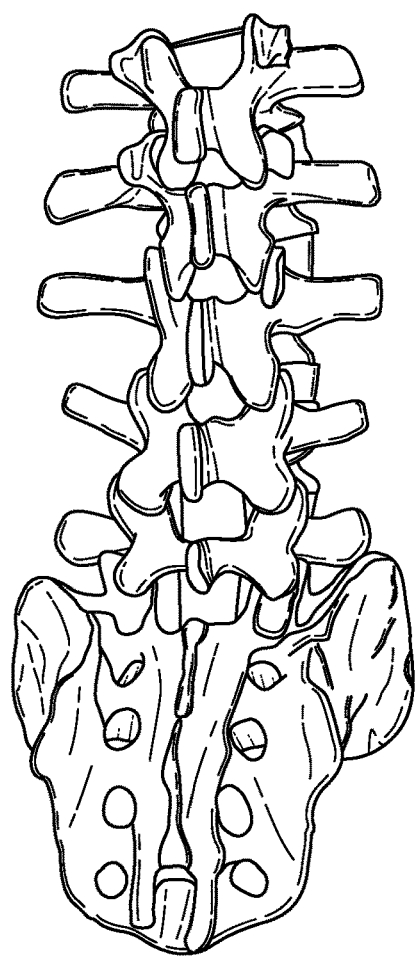
FIG. 3B illustrates a lumbosacral region of a spine, at least a portion of which may be surgically exposed for scanning utilizing LIDAR imaging technology.

FIG. 3B shows a lumbosacral region of the spine, which may be the region where a majority of spinal fusion procedures are performed. A portion of the lumbosacral region may be surgically exposed prior to or during a spinal fusion procedure or operation. For example, if an L5-S1 fusion is desired to be performed, the L5 and S1 vertebrae (and potentially some of the adjacent vertebrae) may be surgically exposed to facilitate access for performing the spinal fusion procedure or operation. FIG. 3B shows an anatomical surface or profile of the spine that includes anatomical and/or artificial landmarks that can be identified by imaging technology (e.g., imaging hardware such as cameras or scanners and software executing algorithms stored on a computer-readable storage medium). The anatomical landmarks can include, for example, spinous processes of various vertebrae. The anatomical or artificial landmarks may also include junctions between a transverse process and an adjacent facet.

Figure 3C:
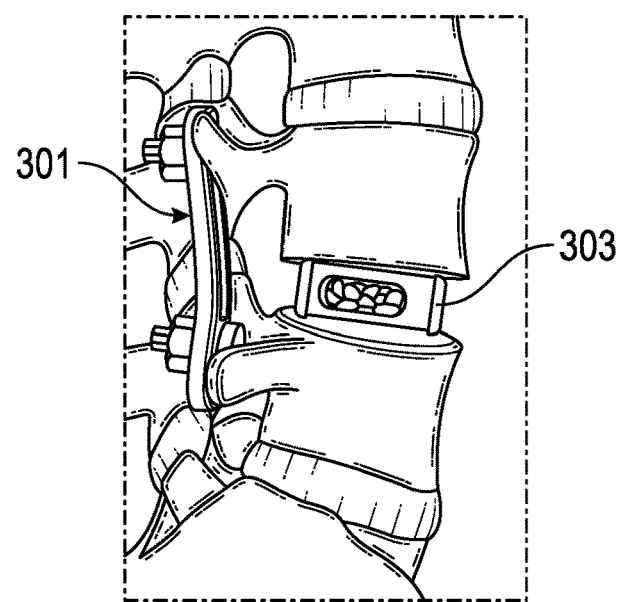
FIG. 3C illustrates a portion of a spine after insertion of fusion hardware (e.g., spinal rods, screws or plates and an interbody fusion device (e.g., cage with bone graft material)

FIG. 3C shows an example of hardware 301 and an interbody fusion device 303 that have been inserted as part of a fusion procedure between two lumbar vertebrae (e.g., L4 and L5). The fusion hardware 301 may include multiple pedicle screws, rods, and/or plates. The interbody fusion device 303 may comprise a cage or spacer positioned in an intervertebral space between two vertebrae and may include bone graft material or bone growth-promoting materials. The imaging systems and methods described herein may be used to facilitate insertion of the fusion hardware 301 and/or interbody fusion device 303 intraoperatively during a spinal fusion procedure without requiring prior advance knowledge of the particular spinal anatomy.

Figure 3D:
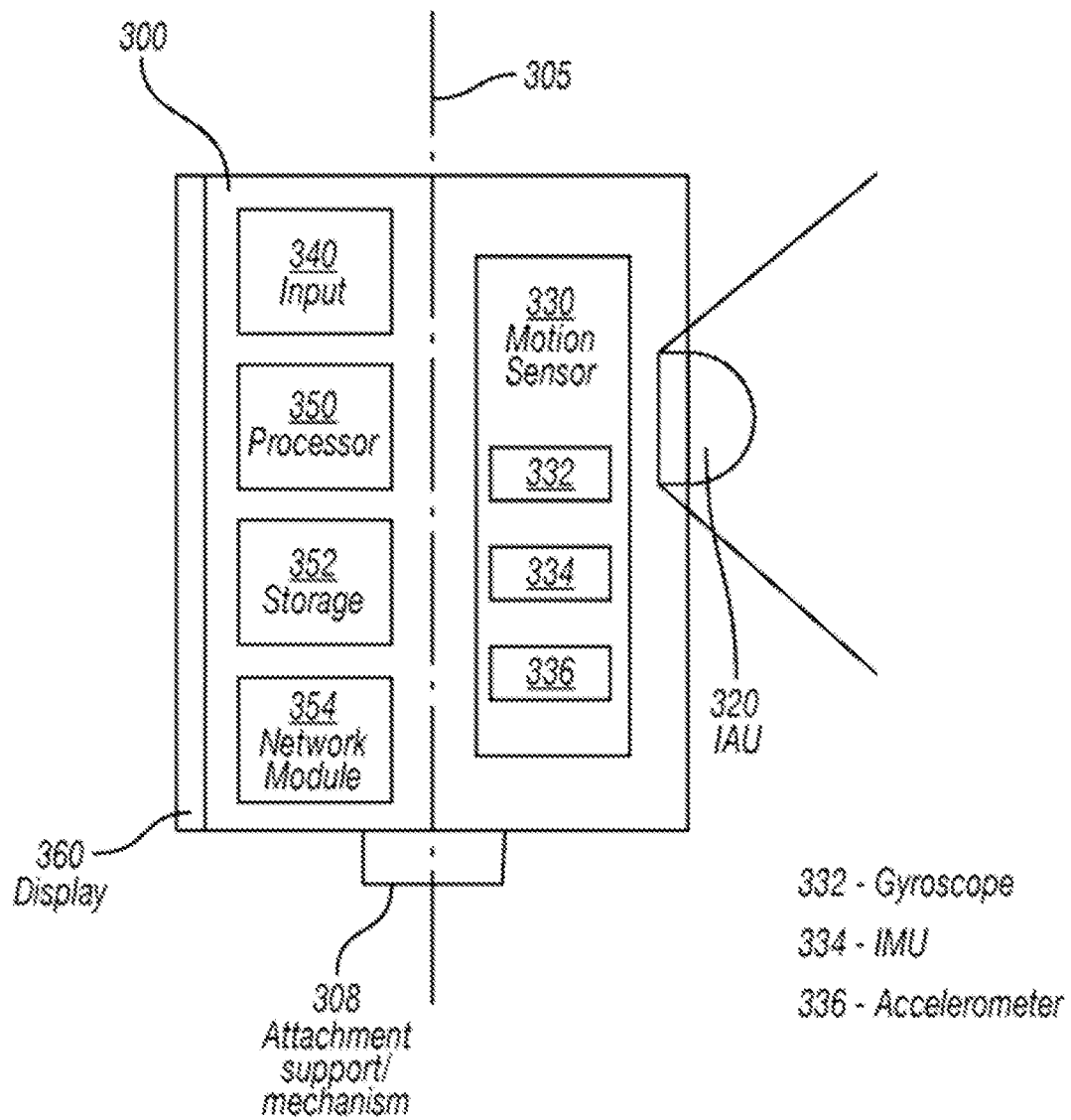
FIG. 3D schematically illustrates a block diagram of a mobile computing device that can be used in accordance with embodiments described herein.

FIG. 3D schematically illustrates an embodiment of a mobile computing device 300 that can be used to facilitating improved access for insertion of surgical tools and/or medical devices (e.g., diagnostic devices, permanent implants, pedicle screws, interbody fusion devices, temporary treatment devices). The mobile computing device 300 includes an image acquisition unit 320 for capturing imaging data. The image acquisition unit 320 may include one or more optical cameras to capture live video or still images. The image acquisition unit 320 may also include one or more LIDAR sensors or scanners to facilitate capture of LIDAR imaging data of anatomical landscapes. The LIDAR sensors or scanners may transmit laser pulses to the anatomical surface and then sense the light that is reflected or scatted back from the anatomical surface in order to determine distances to the anatomical surface at different locations. The data may be used to generate a topographical map or image of the anatomical surface, profile, or contour. In some aspects, the images or imaging data may be obtained by positioning the mobile computing device 300 and/or image acquisition unit 320 in parallel with the transverse, sagittal, or coronal plane to obtain the images or imaging data. In some implementations, an attachment support and/or mechanism 308 is used to align and/or secure the mobile computing device 300 to an insertion tool (e.g., a tool that creates a pilot hole).

In some configurations, the one or more optical cameras can include a camera having sufficient field of view to properly align an axis 305 of the mobile computing device 300 with a desired plane. In some embodiments, the axis 305 is representative of a vertical line centered laterally with respect to the image(s) being captured. For example, if the desired image is intended to capture the vertebra from a cross sectional, axial view (e.g., see FIG. 2A), the axis 305 is aligned with the sagittal plane (i.e., the plane that is sagittal to the vertebra) and the image acquisition unit 320 is positioned parallel to the transverse plane to capture the top-down view of the vertebra shown in FIG. 2A. If the desired image is intended to capture the vertebra from a side view (e.g., a lateral image of the vertebra, see FIG. 2B), the axis 305 is aligned with the transverse plane (i.e., the plane that is transverse to the vertebra) and the image acquisition unit 320 is positioned parallel to the sagittal plane. If the desired image is intended to capture the vertebra from a posterior or anterior view (see, for example, FIG. 2C), the axis 305 is aligned with the sagittal plane and the image acquisition unit 320 is positioned parallel to the coronal plane.

In some configurations, the image acquisition unit 302 may receive or capture diagnostic images of a patient. The images may be a processed diagnostic image, e.g., an image displayed on a screen, a film, or a printed photograph that is captured by an optical camera of the image acquisition unit 302. In other configurations, the image acquisition unit 302 can directly use an image taken from an external machine (not illustrated), such as a radiograph, an X-ray machine, a computed tomography (CT) scanner, a millimeter (MM) wave scanner, or a magnetic resonance imaging (MRI) scanner.

The mobile computing device 300 includes an orientation apparatus 330 that is operable to detect changes in movement, orientation, and/or position. In some configurations, the orientation apparatus 330 includes at least one of a gyroscope 332, an inertial measurement unit 334, and an accelerometer 336. However, in other configurations, the orientation apparatus 330 only includes the gyroscope 332 with three axes of rotation to be able to determine a three-dimensional orientation of the mobile computing device 300. The gyroscope 332 is operable to measure at least one axis of rotation, for example, the axis parallel to the intersection of the sagittal plane and the coronal plane. In other configurations, the gyroscope 332 includes more than one sensing axes of rotation, such as three axes of rotation, for detecting orientation and changes in orientation. The inertial measurement unit 334 can detect changes of position in one or more directions in, for example, a cardinal coordinate system. The accelerometer 336 can detect changes of speeds in one or more directions in, for example, a cardinal coordinate system. In some configurations, data from all components of the orientation apparatus 330 are used to calculate continuous, dynamic changes in orientation and position.

The mobile computing device 300 further includes an input component 340 that is operable to receive user input, such as through a keypad or touchscreen. The user input may include, for example, patient information, a device insertion location, user commands or preferences, and/or a desired entry angle representing an insertion direction of a device. In various configurations, the input component 340 can include a multi-touch screen, a computer mouse, a keyboard, a touch sensitive pad, or any other input device.

In some configurations, the mobile computing device 300 further includes one or more processors 350. The processor 350 can be any processing unit capable of basic computation and capable of executing a program, software, firmware, or any application commonly known in the art of computer science (e.g., apps downloadable from an online application software storefront). The mobile computing device 300 may further include a memory storage unit 352 and a network interface module 354. The memory storage unit 352 can be a hard drive, random access memory, solid-state memory, flash memory, or any other storage device. Memory storage unit 352 saves data related to at least an operating system, application, and patient profiles. The network interface module 354 allows the mobile computing device 300 to communicate with external equipment as well as communication networks (e.g., via Bluetooth, WiFi, Ethernet and/or other communication networks).

In some configurations, the mobile computing device 300 further includes a display 360. In some embodiments, the display 360 is a liquid crystal display that also serves as an input using a multi-touch screen (e.g., a capacitive touch screen, a resistive touch screen, a surface acoustic wave touch screen, or an infrared touch screen). The mobile computing device 300 may provide any number of notifications to a user, including visual, auditory, and tactile alerts or notifications, such as, for example, vibrations. The mobile computing device 300 may include a speaker to provide auditory alerts or notifications. In accordance with several embodiments, the display 360 is not a stereoscopic display.

Figure 4:
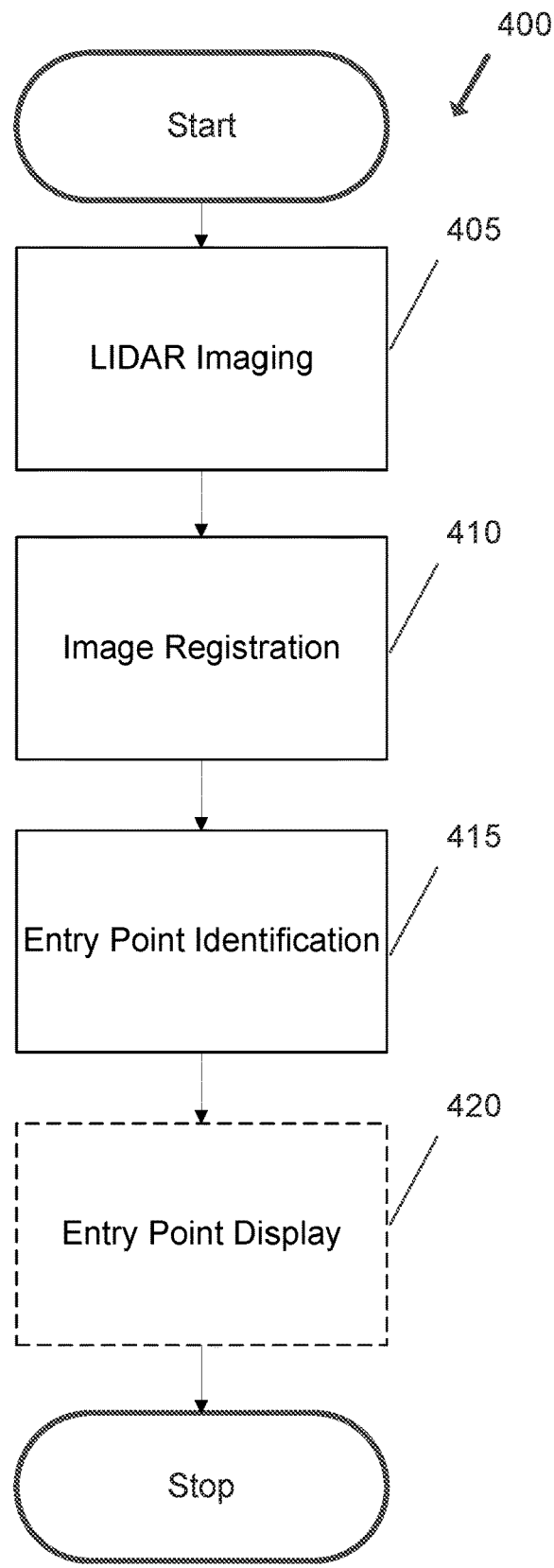
FIG. 4 illustrates an example method of identifying a surgical entry point for a surgical tool and/or medical device based on LIDAR imaging.

Turning to FIG. 4, a method 400 of facilitating improved access for insertion of surgical tools or medical devices (e.g., diagnostic devices, implants, pedicle screws, interbody fusion devices) utilizing surface-based imaging is illustrated. In accordance with several implementations, the method 400 does not require a surgeon or other clinician to locate an entry point for insertion of the surgical tool and/or medical device (e.g., diagnostic device, implant) on his or her own based on any prior knowledge of the particular anatomy. Instead, the entry point location can be automatically identified without any requisite prior anatomical knowledge. The method 400 starts at Block 405 with surface-based imaging (e.g., LIDAR, time-of-flight 3D laser scanner or camera, optical topographical scanner, a structured-light 3D scanner, a hand-held laser scanner, a depth camera). In accordance with several aspects, LIDAR imaging may be used to image (e.g., map) anatomical landmarks of the spine (e.g., spinous processes, junctions between a transverse process and a facet, back muscles, spine muscles, and/or median furrows). LIDAR imaging may also be used to image artificial landmarks of the spine, such as a 3×3 inch piece of plastic or some other material, with several dots (e.g., the size of a hole punch) placed around it. Other dimensions or other artificial landmarks may also be used.

The LIDAR imaging may be performed using dedicated stand-alone LIDAR equipment or may be performed using LIDAR technology (e.g., hardware such as sensors or scanners and processor(s) and firmware or software with program instructions stored in a computer-readable medium that are executable by the processor(s)) included in a mobile computing device (e.g., mobile computing device 300), such as an iPhone, an iPod Touch, an iPad, or other smartphone or tablet (e.g. Android phone, Android tablet, Windows Phone, Windows tablet, Blackberry phone.).

A software application (e.g., app) on the mobile computing device (e.g., stored in memory storage unit 352) may include algorithms (e.g., executable program instructions stored in memory) adapted to cause the built-in LIDAR technology to facilitate or carry out mapping of an anatomical surface (e.g., at least a portion of a patient's spinal anatomy, such as a portion of the vertebral column or multiple vertebrae). For example, the software application may provide instructions to the user on a display of the mobile computing device to facilitate proper capture of LIDAR imaging data of at least a particular portion of the anatomy (e.g., bones of a portion or region of the spine). The software application may include verification checking to ensure that the captured LIDAR imaging data is acceptable for use. A map of the anatomical surface (e.g., at least a portion of a patient's back) may be created based on data obtained by the LIDAR technology (e.g., point cloud data may be used to reconstruct a surface map using point cloud construction algorithms). The anatomical surface may include all or a portion of the spine of a patient (e.g., lumbar portion, lumbo-sacral portion, cervical portion, thoracic portion), depending on the portion that is surgically exposed for surface-based imaging. Other anatomical surfaces, profiles or contours other than the spinal anatomy may also be imaged in other implementations. Smoothing or filtering of the LIDAR data may be performed to denoise the data (e.g., using high quality interpolation techniques, intelligent point thinning techniques, Gaussian smoothing techniques, etc.).

At Block 410, the mapping data generated by the LIDAR technology can be automatically correlated or registered with previously-acquired diagnostic images of the subject's spine (e.g., CT scan images, MM scan images, X-ray images, MRI scan images, radiography scan images, ultrasonography, radiation therapy). For example, the previously-acquired diagnostic images (i.e., DICOM data) may be aggregated and stored utilizing the digital imaging and communications in medicine (DICOM) standard to enable inoperability across systems and devices described herein. The previously-acquired images (or DICOM data) may be obtained using axial imaging techniques, for example. In some implementations, if there are no stored diagnostic medical images to select from, the user may be prompted to take photos of one or more diagnostic images using an optical camera of the image acquisition unit 320 of the mobile computing device 300. The automatic correlation or registration may be performed using various registration techniques and algorithms (e.g., geometry-based, feature-based, surface-based, intensity-based, and/or other image registration algorithms, transformation models, matching algorithms, etc. The automatic correlation or registration may incorporate use of feature extraction or image detection processes and algorithms. The use of surface-based imaging (e.g., LIDAR imaging) in combination with intraoperative radiographic imaging (e.g., fluoroscopy, CT imaging) advantageously reduces radiation exposure to the patient and clinical staff, as well as reduces time required for registration (and thus overall duration of the surgery or procedure).

At Block 415, important anatomical landmarks can be identified to facilitate insertion of surgical tools or medical devices based on the correlated images. In some implementations, the identification may incorporate use of a trained neural network or machine learning database trained using a training set of multiple anatomical surface scans and/or diagnostic images. A particular vertebra or vertebrae may be identified and certain anatomical and/or artificial landmarks of the vertebra or vertebrae may be identified based on the correlated imaging data. For example, an entry point for a pilot hole to be formed into a pedicle for insertion of a pedicle screw may be identified based, at least in part, on identification of a location of a spinous process of a particular vertebra, identification of the particular vertebra, and/or identification of other anatomical or artificial landmarks. In accordance with several implementations, the LIDAR map may be enhanced to recreate portions of the spine not surgically exposed based on interpolation techniques based on adjacent spine portions and anatomical landmarks that are exposed and able to be imaged using surface-based imaging techniques. As another example, an entry point for insertion of an interbody device, such as a fusion cage with bone graft material, may be identified based on the identification of anatomical or artificial landmarks.

At Block 420, the entry point may optionally be displayed to a user (e.g. surgeon) on a display of the mobile computing device 300. For example, a 2D or 3D LIDAR image or map may be displayed and a graphical icon (e.g., an "X", a target icon, or a crosshair icon) may be overlaid or superimposed on the image to indicate the entry point. As another example, a camera of the mobile computing device 300 can be used to display real-time imaging (e.g., live video) or to capture a still image of the patient's anatomical surface landscape and the graphical icon may be overlaid or superimposed on the real-time video imaging or the still image. Any of the steps of the method 400 may be implemented by a processor (e.g., processor 350) of the mobile computing device (e.g., mobile computing device 300) upon execution of program instructions (e.g., algorithms) stored on a computer-readable medium (e.g., memory storage unit 352).

Figure 5:
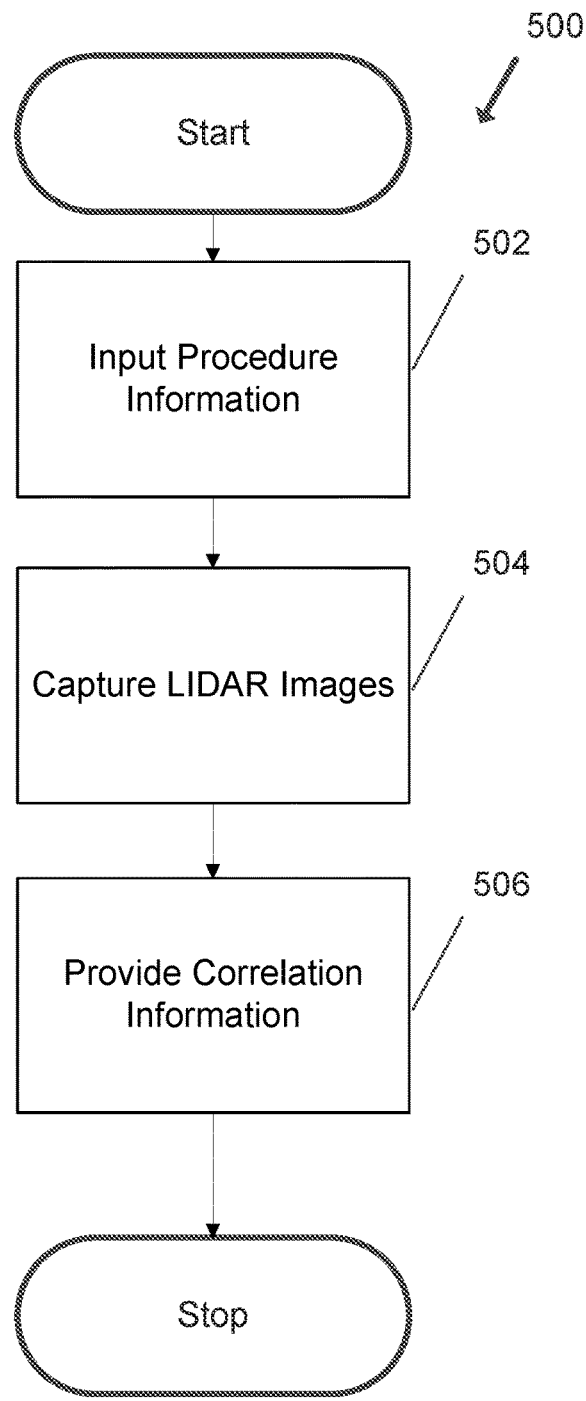
FIG. 5 illustrates an example method of steps to be performed by a user to facilitate entry point identification based on LIDAR imaging.

FIG. 5 illustrates an embodiment of a method 500 that a user (e.g., surgeon or other clinician) may perform using a software application on a single mobile computing device to facilitate identification of an entry point for insertion of a bone drill or pedicle screw through a pedicle of a vertebra. At Block 502, the user may input information corresponding to a particular procedure to be performed or a particular vertebral location or spine level (e.g., an L5/S1 spinal fusion, or a particular vertebral level, such as L5). At Block 504, the user may capture surface-based (e.g., LIDAR) image data of at least a portion of the patient's anatomical landscape using built-in LIDAR technology of the mobile computing device 300. At Block 506, the user may provide correlation information to the software application (e.g., patient identification, selection of one or more pre-acquired patient medical images) so as to allow the software application to correlate mapping data generated by the LIDAR technology with pre-acquired medical images of at least a portion of the patient's anatomy corresponding to the LIDAR mapping data. In some implementations, if there are no stored diagnostic medical images to select from, the user may be prompted to take optical photos of one or more diagnostic images using an optical camera of the mobile computing device 300. A similar method may be performed to facilitate identification of an entry point for insertion of an interbody fusion device.

Figure 6:
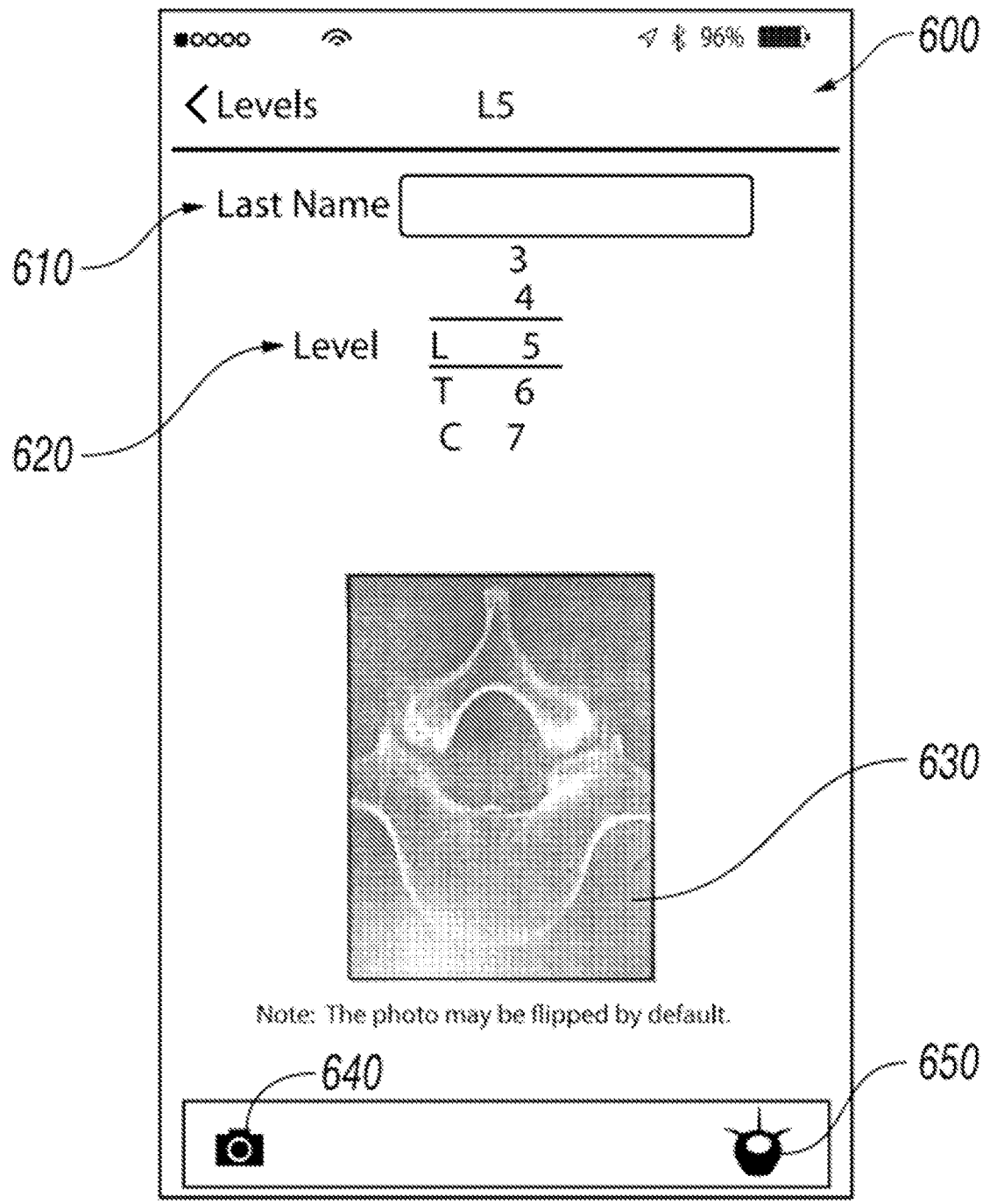
FIG. 6 illustrates an example graphical user interface on a display of a mobile computing device that can be used to capture LIDAR images.

FIG. 6 illustrates an example graphical user interface for display on a mobile computing device to facilitate insertion of information by a user in performing the method 500 of FIG. 5. The user may insert, for example, a patient name in a textual name field 610 or a target vertebral level using a graphical user interface selection feature 620. The user may also select a stored pre-acquired medical image 630 or click on a camera icon 640 to take a new picture of a medical (e.g., diagnostic) image. The graphical user interface button 650 may allow the user to move onto a further screen or next step.

Figure 7:
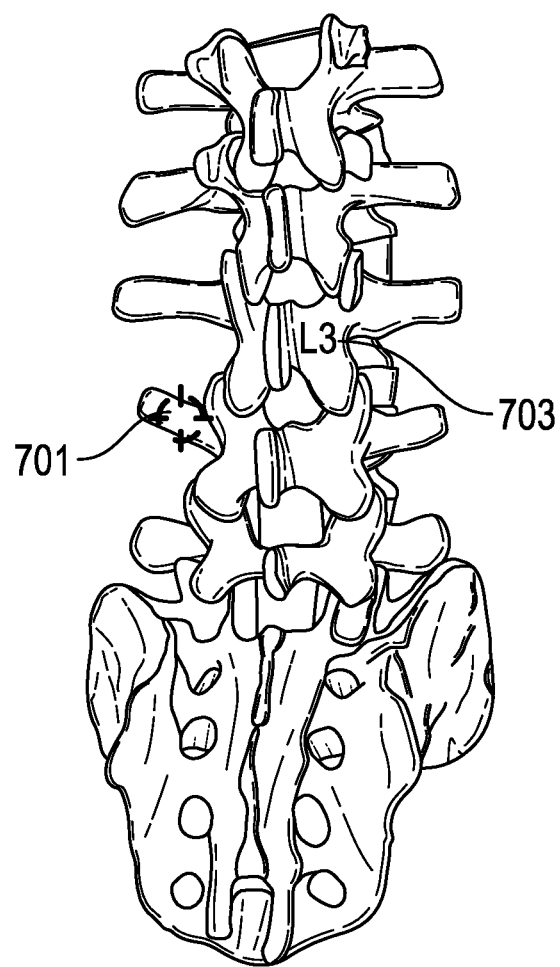
FIG. 7 shows an example augmented reality image that can be displayed on a display device positioned in a surgical field of view.

Turning to FIG. 7, the display on the mobile computing device may comprise an augmented reality display that uses the optical camera of the image acquisition unit of the mobile computing device (e.g., mobile computing device 300) to capture a live video of the anatomical landscape and then the real-world video may be enhanced with overlaid, or superimposed, virtual information (e.g., digital graphical icons, textual information, 3D shapes or representations). For example, the live video may include an overlaid, or superimposed, 2D or 3D graphical icon or image 701 (e.g., arrow icon or crosshair icon or a 3D image of a shape (e.g., cylinder) or a 3D representation of a surgical instrument or medical device) indicating an entry point (and a trajectory for 3D images) for insertion of a drill to form a pilot hole or for insertion of a pedicle screw into a pedicle of a particular vertebral body. The live video may also include superimposed alphanumeric labels 703 indicative of vertebral levels or other anatomical information. The augmented reality display could further include a 2D or 3D virtual representation of at least a portion of the spine below the skin surface showing portions of the spine not visible through the skin surface (e.g., portions not surgically exposed).

Figure 8:
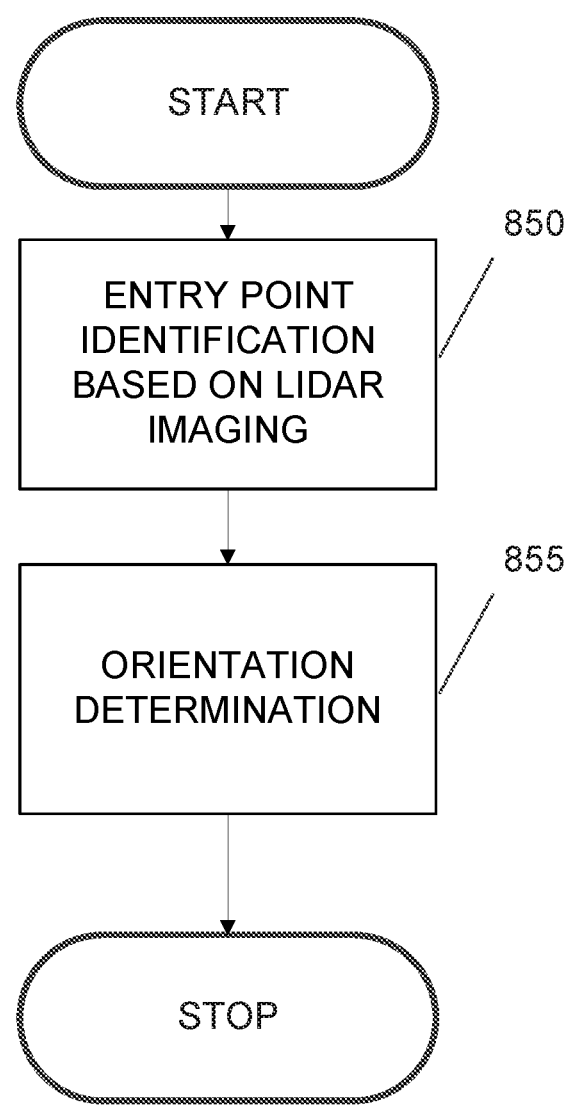
FIG. 8 illustrates an example method of facilitating image guided surgery involving performing orientation guidance in combination with entry point identification based on LIDAR imaging.

With reference to FIG. 8, a method 800 of facilitating improved access for insertion of surgical tools and/or medical devices (e.g., diagnostic devices, implants such as pedicle screws or interbody fusion devices) may include both entry point identification based on surface-based (e.g., LIDAR) imaging and orientation/trajectory determination implemented using a single software application on a single mobile computing device (e.g., a smartphone, tablet, or iPod touch). The method 800 can include performing entry point identification based on LIDAR imaging at Block 850. The entry point identification may be performed using the mobile computing device 300 as described previously herein. At Block 855, orientation determination and proper insertion trajectory may be performed with the mobile computing device 300 using methods such as described, for example, in U.S. Pat. No. 10,123,840; US Publ. No. 2019/0060000; and WIPO Publ. No. WO2020/214744, the entire content of each of which is hereby incorporated by reference herein. The display of the mobile computing device 300 may include visual cues and/or textual prompts to facilitate entry point identification or location and orientation/trajectory determination for insertion of surgical tools and/or medical devices.

Figure 9:
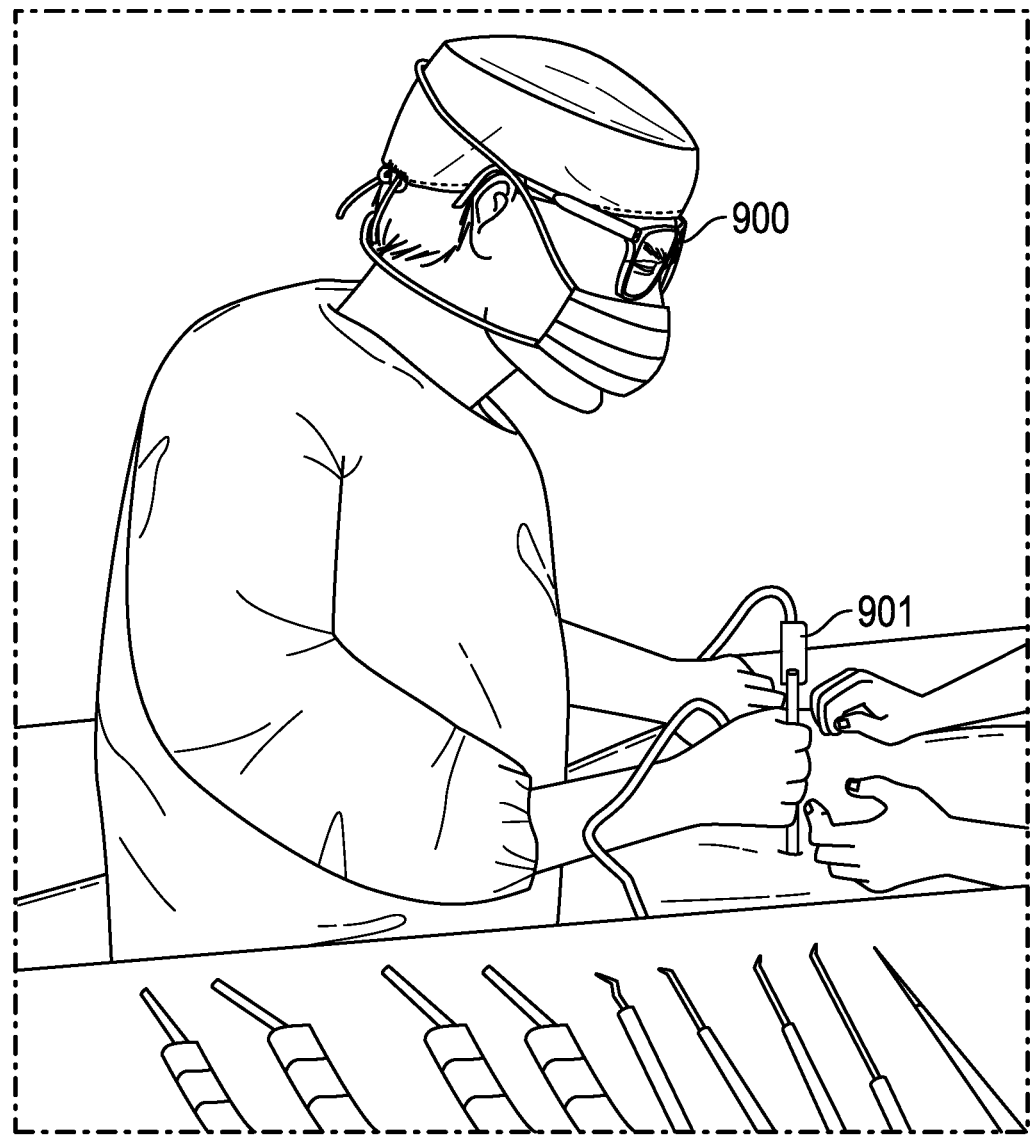
FIG. 9 illustrates an example implementation of wearable eyewear (e.g., glasses) to facilitate augmented reality and/or virtual reality displays.

With reference to FIG. 9, the augmented reality display functionality may be incorporated into wearable eyewear 900 in addition to, or as an alternative to, the display 360 on the mobile computing device 300. The wearable eyewear 900 may be a pair of augmented reality/virtual reality smartglasses or goggles (e.g., Google Glass™ device, Microsoft Hololens® device, Facebook Ray-Ban smartglasses, Vuzix Blade smartglasses, Sony SED smartglasses, Epson Moverio BT-300 smartglasses, or Apple Glass™ device). The wearable eyewear 900 (e.g., pair of glasses or goggles) may include one or more optical cameras to image the real world instead of relying on the optical camera(s) of the mobile computing device (e.g., mobile computing device 300). A surgeon may view the display in the wearable eyewear 900 or other wearable device (e.g., standard augmented reality/virtual reality headset) while looking directly along the surgical field of view to manipulate a surgical instrument or medical device 901 into and through an entry point to a target location along a particular trajectory or orientation direction. The wearable eyewear 900 may be communicatively coupled to the mobile computing device 300 via a wired or wireless connection (e.g., Bluetooth wireless connection). The wearable eyewear 900 or other wearable device may include a heads-up display. In accordance with several embodiments, the wearable eyewear 900 does not incorporate a stereoscopic optical see-through head mounted display and does not require markers to be attached to a patient to facilitate imaging. Wearable eyewear 900 that comprises a pair of glasses or goggles may advantageously be more lightweight and comfortable than a standard head-mounted AR/VR headset. However, a headset may be used in some embodiments as desired.

In accordance with several embodiments, one or more structural and/or functional components of the mobile computing device 300 may be incorporated into the wearable eyewear 900 (e.g., goggles or glasses). For example, the wearable eyewear 900 may incorporate LIDAR scanning technology and/or one or more optical cameras. Thus, in several embodiments, a separate mobile computing device 300 may not be needed and the methods described herein and in the published documents incorporated by reference (e.g., methods 400 and 800 involving LIDAR mapping of anatomical surfaces to facilitate entry point identification and/or insertion along a particular trajectory) can be fully performed in a standalone manner by the wearable augmented reality device (e.g., eyewear 900). The wearable augmented reality device (e.g., eyewear 900) may include an image acquisition unit comprising one or more optical cameras and one/or more LIDAR sensors and a processor configured to execute instructions stored in memory of the wearable augmented reality device to perform the methods described herein and in the published documents incorporated by reference ((e.g., methods 400 and 800). In other implementations, the wearable augmented reality device (e.g., eyewear 900) with built-in LIDAR sensing technology may operate in conjunction with the mobile computing device 300.

The augmented reality display may alternatively or additionally be implemented as a virtual reality display in order to facilitate practicing of the insertion procedure by the surgeon or other clinician as a preparation or planning tool. Additional details regarding augmented reality and/or virtual reality implementations for orientation determination can be found, for example, in Paragraphs [0085]-[0095] of US Publ. No. 2020/0229869, the entire content of which is hereby incorporated by reference herein and in Paragraphs [0104]-[0115] of WIPO Publ. No. WO2020/214744, which was previously incorporated by reference herein.

In some implementations, the mobile computing device comprises various features that are present as single features (as opposed to multiple features). For example, in one embodiment, the mobile computing device includes a single optical camera, a single orientation apparatus, and/or a single LIDAR sensor. Multiple features or components are provided in alternate embodiments.

In some embodiments, the system comprises one or more of the following: means for surface-based scanning (e.g., LIDAR scanning/sensing device), means for optical imaging (e.g., live video imaging or still imaging acquisition units, such as optical cameras), means for determining orientation (e.g., gyroscope), means for storing data (e.g., memory), means for displaying information (e.g., augmented reality display), etc.

All of the methods and processes described above may be embodied in, and fully automated via, software code modules executed by one or more computers or processors. The code modules may be stored in any type of non-transitory computer-readable medium or other computer storage device. Some or all of the methods may alternatively be embodied in specialized computer hardware. The modules may be implemented as software in the form of an algorithm or machine-readable instructions. In this case, module is not a generic placeholder for a structural element since the module is stored in a memory and therefore is being used to represent only a non-structural element. The non-structural element is software that is a purely functional limitation. Any routine descriptions, elements or blocks in the flow diagrams described herein and/or depicted in the attached figures should be understood as potentially representing modules, segments, or portions of code which include one or more executable instructions for implementing specific logical functions or elements in the routine.

Although certain embodiments and examples have been described herein, aspects of the methods and devices shown and described in the present disclosure may be differently combined and/or modified to form still further embodiments. Additionally, the methods described herein may be practiced using any device suitable for performing the recited steps. Further, the disclosure (including the figures) herein of any particular feature, aspect, method, property, characteristic, quality, attribute, element, or the like in connection with various embodiments can be used in all other embodiments set forth herein. Any section headings used herein are merely provided to enhance readability and are not intended to limit the scope of the embodiments disclosed in a particular section to the features or elements disclosed in that section.

While the embodiments are susceptible to various modifications, and alternative forms, specific examples thereof have been shown in the drawings and are herein described in detail. It should be understood, however, that the embodiments are not to be limited to the particular forms or methods disclosed, but to the contrary, the embodiments are to cover all modifications, equivalents, and alternatives falling within the spirit and scope of the various embodiments described and the appended claims. Any methods disclosed herein need not be performed in the order recited. The methods disclosed herein include certain actions taken by a practitioner; however, they can also include any third-party instruction of those actions, either expressly or by implication.

Throughout this specification and the claims which follow, unless the context requires otherwise, the word "comprise", and variations such as "comprises" and "comprising" means various components can be co-jointly employed in the methods and articles (e.g., compositions and apparatuses including device and methods). For example, the term "comprising" will be understood to imply the inclusion of any stated elements or steps but not the exclusion of any other elements or steps.

Although the preceding description has been described herein with reference to particular means, materials and embodiments, it is not intended to be limited to the particulars disclosed herein; rather, it extends to all functionally equivalent structures, methods, and uses, such as are within the scope of the appended claims.

While this specification contains many specific implementation details and/or arrangement details, these should not be construed as limitations on the scope of any inventions or of what may be claimed, but rather as descriptions of features specific to particular implementations and/or arrangements of the systems and methods described herein. Certain features that are described in this specification in the context of separate implementations and/or arrangements can also be implemented and/or arranged in combination in a single implementation and/or arrangement. Conversely, various features that are described in the context of a single implementation and/or arrangement can also be implemented and arranged in multiple implementations and/or arrangements separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Additionally, features described with respect to particular headings may be utilized with respect to and/or in combination with illustrative arrangement described under other headings; headings, where provided, are included solely for the purpose of readability and should not be construed as limiting any features provided with respect to such headings.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations and/or arrangements described above should not be understood as requiring such separation in all implementations and/or arrangements, and it should be understood that the described program components and systems can generally be integrated together in a single software product or packaged into multiple software products.

Having now described some illustrative implementations, implementations, illustrative arrangements, and arrangements it is apparent that the foregoing is illustrative and not limiting, having been presented by way of example. In particular, although many of the examples presented herein involve specific combinations of method acts or system elements, those acts, and those elements may be combined in other ways to accomplish the same objectives. Acts, elements and features discussed only in connection with one implementation and/or arrangement are not intended to be excluded from a similar role in other implementations or arrangements.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations and/or arrangements consisting of the items listed thereafter exclusively. In one arrangement, the systems and methods described herein consist of one, each combination of more than one, or all of the described elements, acts, or components.

Any references to implementations, arrangements, or elements or acts of the systems and methods herein referred to in the singular may also embrace implementations and/or arrangements including a plurality of these elements, and any references in plural to any implementation, arrangement, or element or act herein may also embrace implementations and/or arrangements including only a single element. References in the singular or plural form are not intended to limit the presently disclosed systems or methods, their components, acts, or elements to single or plural configurations. References to any act or element being based on any information, act or element may include implementations and/or arrangements where the act or element is based at least in part on any information, act, or element.

Any implementation disclosed herein may be combined with any other implementation, and references to "an implementation," "some implementations," "an alternate implementation," "various implementation," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

Any arrangement disclosed herein may be combined with any other arrangement, and references to "an arrangement," "some arrangements," "an alternate arrangement," "various arrangements," "one arrangement" or the like are not necessarily mutually exclusive and are intended to indicate that a particular feature, structure, or characteristic described in connection with the arrangement may be included in at least one arrangement. Such terms as used herein are not necessarily all referring to the same arrangement. Any arrangement may be combined with any other arrangement, inclusively or exclusively, in any manner consistent with the aspects and arrangements disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. The foregoing implementations and/or arrangements are illustrative rather than limiting of the described systems and methods. Scope of the systems and methods described herein is thus indicated by the appended claims, rather than the foregoing description, and changes that come within the meaning and range of equivalency of the claims are embraced therein.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors. In some embodiments, a circuit may take the form of one or more analog circuits, electronic circuits (e.g., integrated circuits (IC), discrete circuits, system on a chip (SOC) circuits), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexers, registers, capacitors, inductors, diodes, wiring.

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor), microprocessor. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system) or remotely (e.g., as part of a remote server such as a cloud based server). To that end, a "circuit" as described herein may include components that are distributed across one or more locations.

An exemplary system for implementing the overall system or portions of the embodiments might include a general purpose computing devices in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule-based logic and other logic to accomplish the various database searching steps, correlation steps, comparison steps and decision steps.

What is claimed is:

1. A system for facilitating insertion of a surgical tool or a medical device into a subject, the system comprising:
   a computing device comprising:
     a LIDAR scanner;
     an optical camera, configured to obtain one or more images;
     a display screen; and one or more processors configured to:
receive scanning data from the LIDAR scanner that corresponds to an anatomical surface at a desired location of the subject;
identify one or more anatomical landmarks based on the received scanning data by applying one or more trained neural networks or machine learning databases trained using a set of anatomical surface scans and diagnostic images;
generate an anatomical surface map of the anatomical surface of the desired location of the subject using the one or more anatomical landmarks identified based on the received scanning data;
correlate the anatomical surface map with one or more diagnostic images of at least the desired location of the subject;
determine an anatomical entry point for insertion of the surgical tool or the medical device based on the correlation and based on at least one of the one or more anatomical landmarks identified by applying the one or more trained neural networks or machine learning databases; and
generate an output indicative of the determined anatomical entry point for display.

2. The system of claim 1, wherein the computing device further comprises an orientation sensor.

3. The system of claim 1, wherein the one or more diagnostic images comprise CT or MRI images.

4. The system of claim 1, wherein the display screen of the computing device is configured to provide an augmented reality display that displays virtual digital images superimposed on a video provided by the optical camera.

5. The system of claim 4, wherein the output comprises a 2D or 3D virtual digital icon or image that is superimposed on the video presented on the display screen of the computing device.

6. The system of claim 5, wherein the virtual digital icon or image comprises:
a cross-hair digital icon; or
a 3D image of a medical instrument or shape that is also indicative of a trajectory.

7. The system of claim 1, wherein the LIDAR scanner, the optical camera, and the one or more processors are housed within the computing device; and wherein the display screen is housed within a wearable augmented reality device communicatively coupled to the computing device.

8. The system of claim 1, wherein the LIDAR scanner, the optical camera, the one or more processors, and the display screen of the computing device reside on or in a wearable augmented reality device.

9. The system of claim 1, wherein the anatomical surface at the desired location is at or adjacent to a surgically exposed surface.

10. The system of claim 9, wherein the surgically exposed surface is at least a portion of a spine.

11. The system of claim 1, wherein the anatomical surface at the desired location is a portion of an exterior surface of the subject.

12. The system of claim 1, wherein the computing device is a mobile computing device.

13. The system of claim 1, wherein the one or more processors are further configured to determine a surgical trajectory.

14. The system of claim 13, wherein the surgical trajectory is a 3D trajectory.

15. An apparatus for positioning a surgical tool, the apparatus comprising:
a LIDAR scanner;
a display screen; and
one or more processors configured to:
receive data from the LIDAR scanner of a surgical surface;
identify one or more anatomical landmarks based on the received data by applying one or more trained neural networks or machine learning databases trained using a set of anatomical surface scans and diagnostic images;
generate a surface map of the surgical surface based on at least the data from the LIDAR scanner;
determine an insertion point for the surgical tool based at least on the surface map and one or more diagnostic images and based on at least one of the one or more anatomical landmarks identified by applying the one or more trained neural networks or machine learning databases; and
generate an indication of the insertion point on the display screen.

16. The apparatus of claim 15, wherein the one or more processors are further configured to determine a desired orientation for the surgical tool based at least on the surface map and the insertion point.

17. The apparatus of claim 16, wherein the one or more processors are further configured to generate a simulation of the desired orientation for the surgical tool.

18. The apparatus of claim 17, wherein the one or more processors are further configured to:
determine a current orientation of the surgical tool; and
responsive to the current orientation of the surgical tool being within a threshold of the desired orientation, output a notification.

19. The apparatus of claim 15, wherein the LIDAR scanner, the display screen, and the one or more processors reside on or in a wearable augmented reality device.

20. A method for guiding a surgical tool or a medical device into a subject, the method comprising:
receiving, by one or more processors, scanning data from a LIDAR scanner, the scanning data corresponding to an anatomical surface at a desired location;
identifying, by the one or more processors, one or more anatomical landmarks based on the received scanning data by applying one or more trained neural networks or machine learning databases trained using a set of anatomical surface scans and diagnostic images;
generating, by the one or more processors, an anatomical surface map of the anatomical surface of the desired location of the subject;
correlating, by the one or more processors, the anatomical surface map with one or more diagnostic images of at least the desired location of the subject;
determining, by the one or more processors, an anatomical entry point for insertion of the surgical tool or the medical device based on the correlation and based on at least one of the one or more anatomical landmarks identified by applying the one or more trained neural networks or machine learning databases; and
presenting, by the one or more processors, for display an output indicative of the anatomical entry point.

21. The method of claim 20, wherein the one or more diagnostic images comprise CT or MRI images.

22. The method of claim 20, wherein the output comprises a 2D or 3D virtual digital icon or image that is superimposed on a video of the desired location of the subject on a display screen of a computing device.

23. The method of claim 20, further comprising:
determining, by the one or more processors, a desired orientation of the surgical tool or the medical device to follow at the anatomical entry point using an orientation sensor.

24. The method of claim 23, further comprising:
generating, by the one or more processors, an output of the desired orientation of the surgical tool or the medical device on a display.

* * * * *